US010876978B2

(12) United States Patent
Ogata et al.

(10) Patent No.: US 10,876,978 B2
(45) Date of Patent: Dec. 29, 2020

(54) X-RAY INSPECTING DEVICE, X-RAY THIN FILM INSPECTING METHOD, AND METHOD FOR MEASURING ROCKING CURVE

(71) Applicant: Rigaku Corporation, Tokyo (JP)

(72) Inventors: Kiyoshi Ogata, Tokyo (JP); Kazuhiko Omote, Tokyo (JP); Sei Yoshihara, Tokyo (JP); Yoshiyasu Ito, Tokyo (JP); Hiroshi Motono, Tokyo (JP); Hideaki Takahashi, Tokyo (JP); Takao Kinefuchi, Tokyo (JP); Akifusa Higuchi, Tokyo (JP); Shiro Umegaki, Tokyo (JP); Shigematsu Asano, Tokyo (JP); Ryotaro Yamaguchi, Tokyo (JP); Katsutaka Horada, Tokyo (JP); Makoto Kambe, Tokyo (JP); Licai Jiang, Auburn Hills, MI (US); Boris Verman, Auburn Hills, MI (US)

(73) Assignee: RIGAKU CORPORATION, Tokyo (JP)

( * ) Notice: Subject to any disclaimer, the term of this patent is extended or adjusted under 35 U.S.C. 154(b) by 0 days.

(21) Appl. No.: 16/205,801

(22) PCT Filed: Jul. 12, 2017

(86) PCT No.: PCT/JP2017/025389
§ 371 (c)(1),
(2) Date: Nov. 30, 2018

(87) PCT Pub. No.: WO2018/012527
PCT Pub. Date: Jan. 18, 2018

(65) Prior Publication Data
US 2019/0227005 A1     Jul. 25, 2019

(30) Foreign Application Priority Data
Jul. 15, 2016    (JP) ................. 2016-140892

(51) Int. Cl.
    *G01N 23/20016*     (2018.01)
    *G01B 15/02*     (2006.01)
    (Continued)

(52) U.S. Cl.
    CPC ....... *G01N 23/20016* (2013.01); *G01B 15/02* (2013.01); *G01N 23/207* (2013.01);
    (Continued)

(58) Field of Classification Search
    CPC ....... G01N 23/20016; G01N 23/20025; G01N 23/207; G01N 2223/1016; G01N 2223/06; G01B 15/02; G21K 1/06; G21K 5/02
    See application file for complete search history.

(56) References Cited

U.S. PATENT DOCUMENTS 6,385,289 B1 *   5/2002   Kikuchi ................. G01N 23/20
    378/70
10,209,206 B2 *   2/2019   Barak ....................... G01L 1/24
(Continued)

FOREIGN PATENT DOCUMENTS

JP     2000-155102 A     6/2000
JP     2000292379 A     10/2000
(Continued)

OTHER PUBLICATIONS

Shintaro Kobayashi, et al., "X-ray thin-film measurement techniques, VIII. Detectors and series summary," The Rigaku Journal, 28(1), 2012, p. 8.
(Continued)

*Primary Examiner* — Taeho Jo
(74) *Attorney, Agent, or Firm* — Westerman, Hattori, Daniels & Adrian, LLP

(57) ABSTRACT

In an X-ray inspection device according to the present invention, an X-ray irradiation unit 40 includes a first X-ray
(Continued)

optical element 42 for focusing characteristic X-rays in a vertical direction, and a second X-ray optical element 43 for focusing the characteristic X-rays in a horizontal direction. The first X-ray optical element 42 is constituted by a crystal material having high crystallinity. The second X-ray optical element includes a multilayer mirror.

10 Claims, 19 Drawing Sheets

(51) Int. Cl.
  G21K 1/06      (2006.01)
  G01N 23/207    (2018.01)
  G01N 23/20025  (2018.01)
  G21K 5/02      (2006.01)
(52) U.S. Cl.
  CPC ......... G01N 23/20025 (2013.01); G21K 1/06 (2013.01); G21K 5/02 (2013.01); G01N 2223/1016 (2013.01); G01N 2223/61 (2013.01)

(56) References Cited

U.S. PATENT DOCUMENTS

| | | | | |
|---|---|---|---|---|
| 2001/0043668 A1* | 11/2001 | Hayashi | ................ | G01B 15/02 378/89 |
| 2004/0190681 A1* | 9/2004 | Omote | ................ | G01N 23/20 378/71 |
| 2005/0195941 A1* | 9/2005 | Lischka | ................ | G01N 23/20 378/71 |
| 2006/0088139 A1* | 4/2006 | Nakano | ............ | G01N 23/20016 378/79 |
| 2006/0239405 A1* | 10/2006 | Verman | ................ | B82Y 10/00 378/85 |
| 2009/0225946 A1* | 9/2009 | Inaba | ................ | G01N 23/20 378/73 |
| 2010/0002833 A1* | 1/2010 | Matoba | ................ | G01N 23/223 378/44 |
| 2010/0271621 A1* | 10/2010 | Levy | ................ | G01N 21/47 356/73 |
| 2011/0135062 A1* | 6/2011 | Ishibashi | ................ | G01B 15/04 378/89 |
| 2011/0222656 A1* | 9/2011 | Matoba | ................ | G01N 23/083 378/62 |
| 2011/0280530 A1* | 11/2011 | Verman | ................ | G21K 1/06 385/115 |
| 2012/0051518 A1* | 3/2012 | Omote | ................ | G01N 23/207 378/86 |
| 2012/0087473 A1* | 4/2012 | Omote | ................ | G01B 15/04 378/86 |
| 2012/0281814 A1* | 11/2012 | Yokhin | ................ | G01N 23/207 378/73 |
| 2013/0039460 A1* | 2/2013 | Levy | ................ | G03F 7/70658 378/44 |
| 2013/0136236 A1* | 5/2013 | Morikawa | ................ | G01N 23/20 378/98.2 |
| 2013/0304424 A1* | 11/2013 | Bakeman | ................ | G01N 21/84 702/189 |
| 2014/0067316 A1* | 3/2014 | Ishibashi | ................ | G06F 17/00 702/150 |
| 2014/0204194 A1* | 7/2014 | Otani | ................ | G01N 21/47 348/79 |
| 2014/0270071 A1* | 9/2014 | Shirota | ................ | H01J 35/14 378/62 |
| 2014/0328459 A1* | 11/2014 | Urano | ................ | G01N 23/16 378/58 |
| 2015/0243397 A1* | 8/2015 | Yun | ................ | H01J 35/08 378/36 |
| 2015/0287570 A1* | 10/2015 | Hayashi | ................ | H01J 37/185 250/310 |
| 2015/0369759 A1* | 12/2015 | Mazor | ................ | G01N 23/207 378/89 |
| 2015/0371910 A1* | 12/2015 | Goodwin | ................ | G01N 21/95 438/7 |
| 2016/0139065 A1* | 5/2016 | Barak | ................ | G01N 23/20 378/72 |
| 2016/0356729 A1* | 12/2016 | Bauer | ................ | H01J 37/3056 |
| 2017/0194126 A1* | 7/2017 | Bhaskar | ................ | H01J 37/28 |
| 2017/0234814 A1* | 8/2017 | Ogata | ................ | G01N 23/223 378/44 |
| 2017/0234841 A1 | 8/2017 | Ogata et al. | | |
| 2017/0299528 A1* | 10/2017 | Ogata | ................ | G01N 23/223 |

FOREIGN PATENT DOCUMENTS

| | | |
|---|---|---|
| JP | 2005249787 A | 9/2005 |
| JP | 2006153767 A | 6/2006 |
| JP | 2010261737 A | 11/2010 |
| JP | 2013210377 | 10/2013 |
| WO | WO2004/114325 | 12/2004 |
| WO | WO2016/059672 A1 | 4/2016 |

OTHER PUBLICATIONS

Kazuhiko Omote, "High-throughput Analysis for Combinatorial Epitaxial Thin Films by Concurrent X-Ray Diffraction," Journal of Vaccum Society of Japan, 2011, vol. 54, No. 11, p. 571-576.

Kazuhiko Omote, et al., "A Convergent Beam, Parallel Detection X-Ray Diffraction System for Characterizing Combinatorial Epitaxial Thin Films," Proceedings of SPIE 3941, Combinatorial and Compostion Spread Techniques in Materials and Device Development, 84, May 17, 2000.

Office Action dated Jul. 15, 2020, issued in counterpart to JP Application No. 2018-527625, with English Translation. (12 pages).

Yang, Jianrong, "Physics and technology of HgCdTe materials", National Defense Industry Press, Nov. 2012, pp. 317-318; Cited in CN Office Action dated Oct. 10, 2020. (4 pages).

Office Action dated Oct. 10, 2020, issued in counterpart CN Application No. 201780035084.4, with English Translation. (28 pages).

* cited by examiner

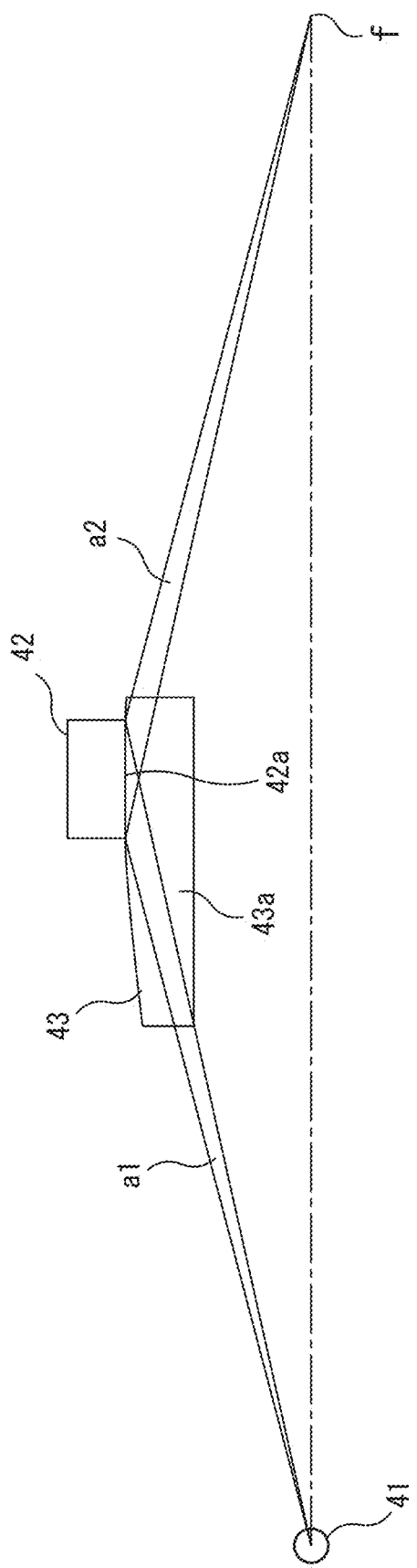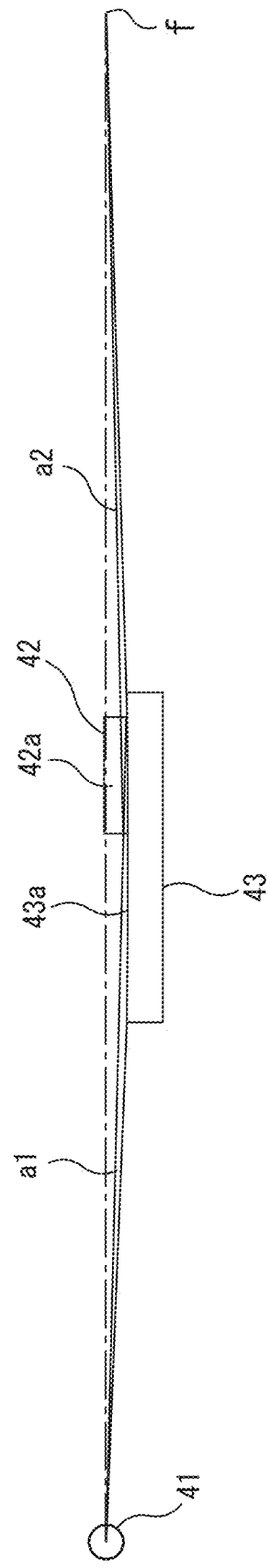

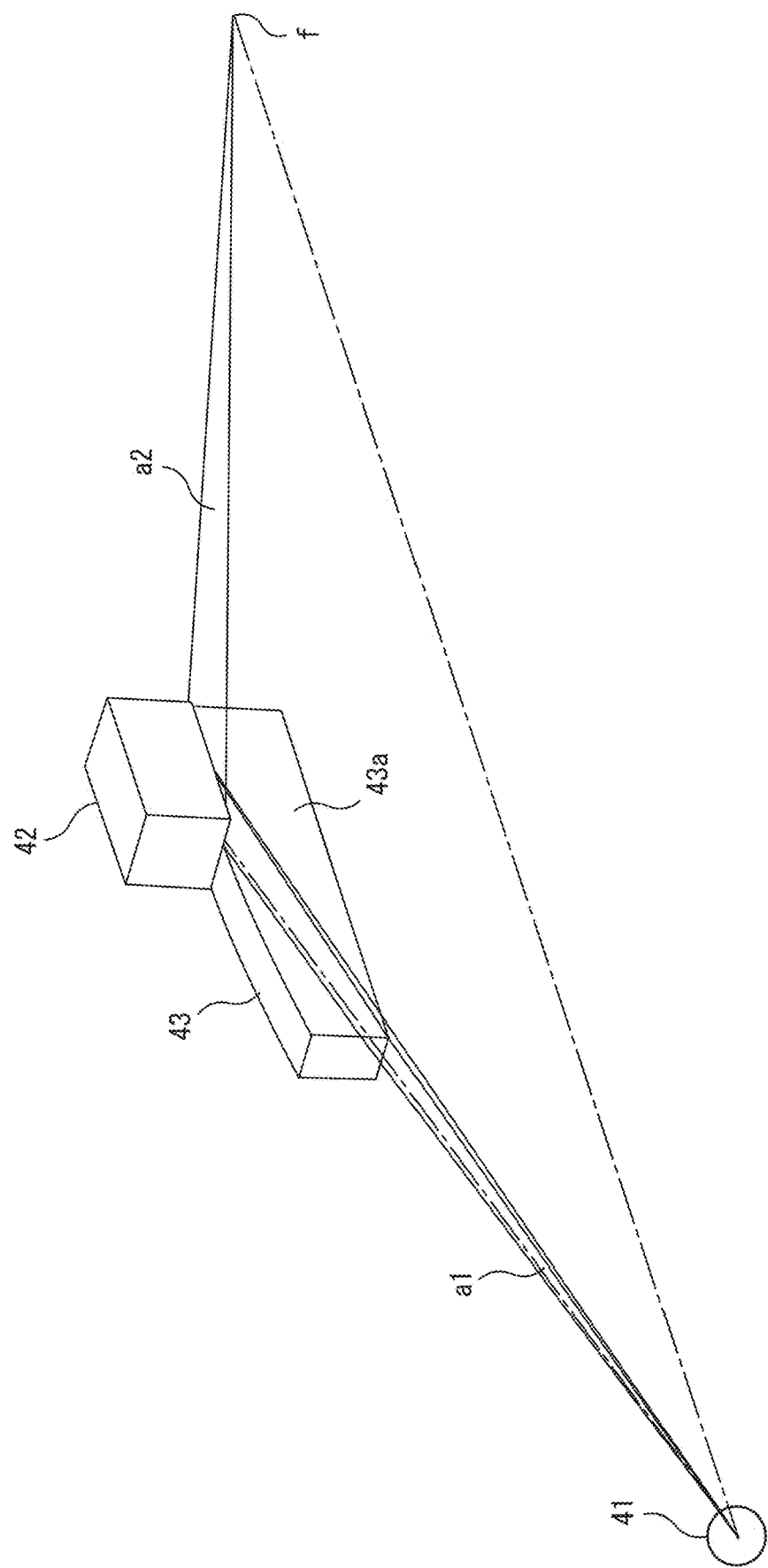

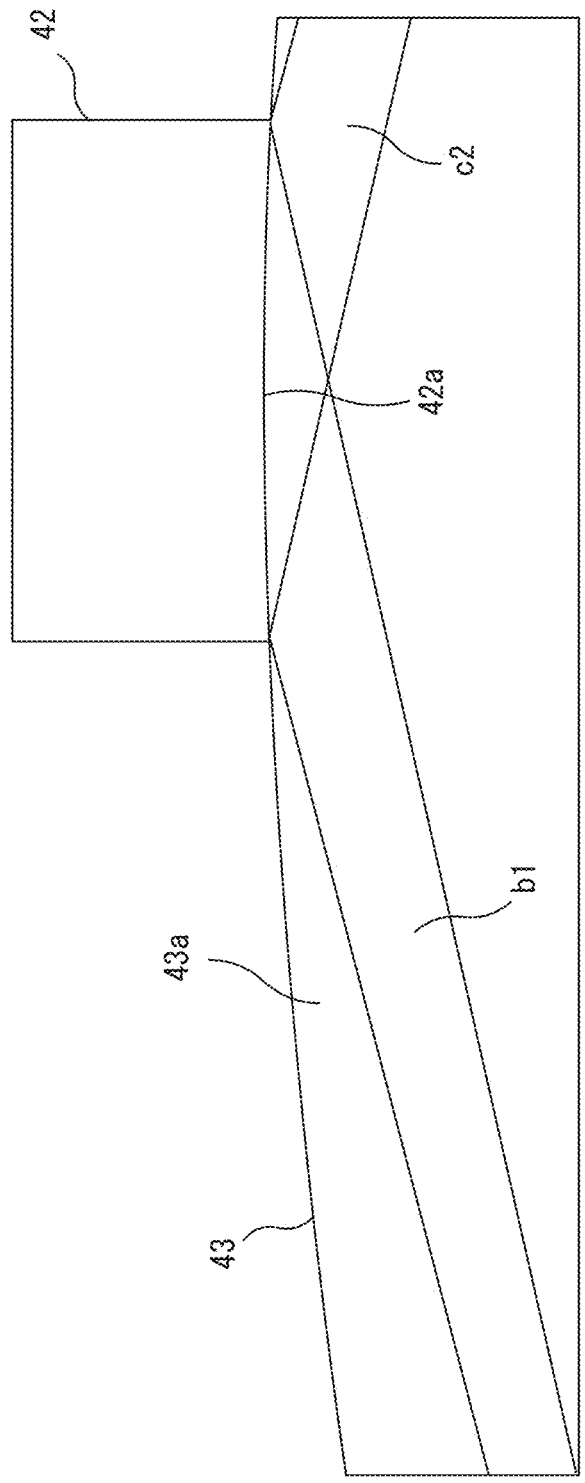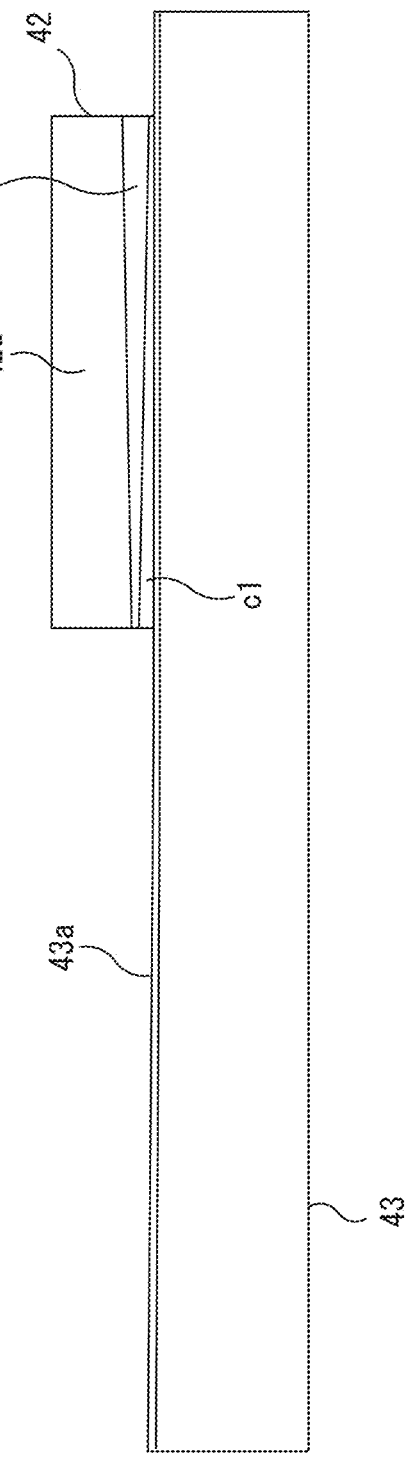

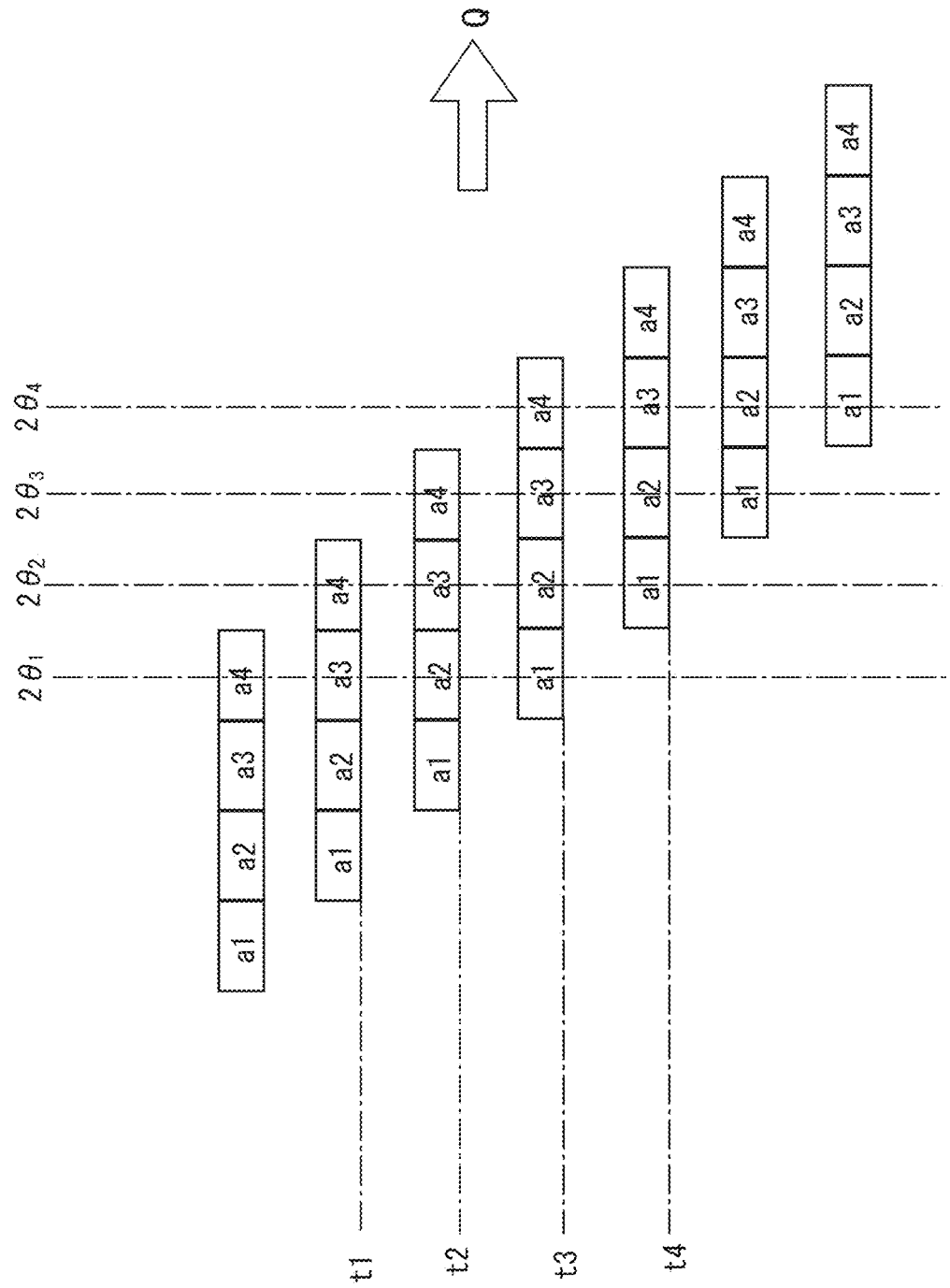

X-RAY INSPECTING DEVICE, X-RAY THIN FILM INSPECTING METHOD, AND METHOD FOR MEASURING ROCKING CURVE

CROSS-REFERENCE TO RELATED APPLICATION

This application is a continuation of PCT/JP2017/025389 filed Jul. 12, 2017 which claims priority to Japanese Patent Application JP 2016-140892 filed on Jul. 15, 2016, the entire contents of both applications are hereby incorporated by reference in their entirety.

TECHNICAL FIELD

The present invention relates to an X-ray inspection device suitable for use in a semiconductor manufacturing field, etc., such as a technical field for manufacturing an element having a multilayer structure in which multiple thin films are laminated on a substrate, and a method for the same.

BACKGROUND ART

The characteristics of a semiconductor, etc., such as an element having a multilayer structure in which multiple thin films are laminated on a substrate vary according to the state of a thin film to be formed, such as the film thickness, density, crystallinity, etc. of the thin film. Microfabrication and integration of these elements have recently progressed, and this tendency has become remarkable. Therefore, a thin film inspection device capable of accurately measuring the states of formed films have been required.

As this type of inspection device have been known direct measurement based on a cross-sectional transmission electron microscope (TEM), a film thickness inspection device using optical interference or ellipsometry, a photoacoustic device, etc. The present situation of the cross-sectional transmission electron microscope (TEM) is that it is impossible to install the cross-sectional transmission electron microscope in an in-line manufacturing process and inspect a thin film as an inspection target in real time, and also a product which is extracted for an inspection from the manufacturing line is discarded after the inspection. Furthermore, the film thickness inspection device using optical interference or ellipsometry and the photoacoustic device are suitable for the in-line process, but have insufficient precision for measurements of thin films of several nm.

Wafers for inspection which are discarded after used (blanket wafers) have imposed a large burden in cost on semiconductor device makers. Particularly, the diameter of semiconductor wafers has recently increased, so that the cost of one blanket wafer has also increased.

In view of the situation as described above, the applicant of the present application has previously proposed an X-ray thin film inspection device that is installable in a process of manufacturing film-formed products, and can directly inspect the products themselves and inspect even thin films of several nm with sufficient precision without discarding wafers after the inspection (see Patent Document 1).

PRIOR ART DOCUMENTS

Patent Documents

Patent Document 1: Japanese Patent Laid-open Application No. 2006-153767

Patent Document 2: Japanese Patent Laid-open Application No. 2013-210377

Patent Document 3: International Publication No. WO2004/114325

Non-Patent Documents

Non-Patent Document 1: X-ray thin-film measurement techniques, VIII. Detectors and series summary/page 8, The Rigaku Journal, 28 (1), 2012

Non-Patent Document 2: High-throughput Analysis for Combinatorial Epitaxial Thin Films by Concurrent X-Ray Diffraction/Journal of the Vacuum Society of Japan Vol. 54 (2011) No. 11

Non-Patent Document 3: A Convergent Beam, Parallel Detection X-ray Diffraction System for Characterizing Combinatorial Epitaxial Thin Films/Proc. SPIE 3941, Combinatorial and Composition Spread Techniques in Materials and Device Development, 84 (May 17, 2000); doi:10.1117/12.385416

DISCLOSURE OF THE INVENTION

Problem to be Solved by the Invention

Furthermore, in the technical field of today advanced LSI (Large-Scale Integration), a GeSi (silicon germanium) layer doped with Ge (germanium) is thinly grown on a Si (silicon) crystal, and further a Si crystal layer is provided on the GeSi layer to distort the crystal of Si and improve the mobility electrons, so that use of thus-formed material called as strained silicon has become mainstream.

In addition, group III-V compound semiconductors such as GaAs (gallium arsenide) and group II-IV compound semiconductors such as GaN (gallium nitride) which have controllable band gaps and high electron mobilities have been used in the technical fields of optical devices, high-speed devices, etc.

Therefore, it has been desired to develop an X-ray inspection device capable of dealing with analysis of the film thickness and composition of a GeSi thin film or a compound semiconductor thin film which constitutes a gate, and further analysis of a strain distributed in the GeSi thin film or the compound semiconductor thin film.

An X-ray inspection device capable of: dealing with these applications is required to have ah extremely high angular resolution with which variation in intensity of diffracted X-rays in a minute angle unit can be detected.

Therefore, the applicant has repeatedly improved the previously proposed X-ray thin film inspection device, and has completed an invention of an X-ray inspection device having an extremely high angular resolution.

Furthermore, it has been recently requested to perform thin film measurements by irradiating an extremely minute inspection area on the surface of a semiconductor wafer with X-rays having large intensities. In a semiconductor manufacturing process, a large number of chips are arranged side by side on a single wafer, and processed and fabricated simultaneously by a lithography technique.

Here, a band-like region having a width of about 80 micrometers or less call ed as a scribe line is arranged between chips, and after completion of a device process, the band-like region is finally cut out by dicing and divided into individual chips. A number of areas for inspection are arranged on this scribe line. Since these areas can be arranged only in a limited area on the scribe line, each of these areas becomes a minute area of about 50 micrometer square, and thus it is very important for an X-ray inspection device to enable an X-ray inspection in this area.

Therefore, it is an object of the present invention to provide an X-ray inspection device that has extremely high angular resolution, and also is capable of focusing X-rays having large intensity onto a very small area and performing measurements with high precision.

It is a further object of the present invention to provide novel X-ray thin film inspection method and rocking curve measuring method that use the aforementioned X-ray inspection device.

Means of Solving the Problem

That is, an X-ray inspection device comprises:
a sample stage on which an inspection target sample is placed;
image observing means for observing an image of the sample placed on the sample stage;
a positioning mechanism that is controlled based on an image observation result of the sample by image observing means to move the sample stage in two orthogonal directions on a horizontal plane, a height direction, and an in-plane rotation direction;
a goniometer including first and second rotation members that rotate independently of each other along a virtual plane perpendicular to a surface of the sample around a rotational axis contained in the same plane as the surface of the sample placed on the sample stage,
an X-ray irradiation unit that is installed in the first rotation member and focuses and irradiates characteristic X-rays to an inspection position set in the same plane as the surface of the sample placed on the sample stage; and
an X-ray detector installed in the second rotation member.
Here, the X-ray irradiation unit includes:
an X-ray tube for generating X-rays; and
an X-ray optical element for receiving irradiated from the X-ray tube, extracting only characteristic X-rays of a specific wavelength and focusing the extracted characteristic X-rays on the inspection position.
Furthermore, the X-ray optical element includes:
a first X-ray optical element for focusing the characteristic X-rays so that a height of the characteristic X-rays decreases within a virtual vertical plane orthogonal to the surface of the sample and containing an optical axis; and
a second X-ray optical element for focusing the characteristic X-rays so that a width of the characteristic X-rays decreases within a virtual plane orthogonal to the virtual vertical plane and containing the optical axis.

The X-ray inspection device according to the present invention having the aforementioned configuration makes X-rays irradiated from the X-ray tube to be incident to the first X-ray optical element and the second X-ray optical element, monochromatizes the incident X-rays by the first X-ray optical element and the second X-ray optical element, and focuses the monochromatized X-rays to the inspection position, so that characteristic X-rays having large intensity can be irradiated to the inspection position.

Here the first X-ray optical element is constituted by a crystal material having high crystallinity. Furthermore, the second X-ray optical element may be constituted by a multilayer mirror.

By constituting the first X-ray optical element with the crystal material having high crystallinity, the divergence angle of characteristic X-rays reflected from the crystal material is small, so that high angular resolution can be obtained in an X-ray inspection.

In the X-ray inspection device according to the present invention described above, it is preferable that the first X-ray optical element is constituted by a crystal material having an inherent rocking curve width of 0.06° or less. By using characteristic X-rays extracted from the first X-ray optical element constituted by the crystal material having high crystallinity as described above, it is possible to obtain high angular resolution of 0.06° or less in the X-ray inspection. In addition, according to the thus-configured first X-ray optical element, it is also possible to set, for example, the height dimension of the characteristic X-rays to 100 micrometers or less, desirably 50 micrometers or less at the inspection position.

Furthermore, it is preferable that the X-ray irradiation unit includes a focusing angle control member for controlling a focusing angle of the characteristic X-rays in the virtual vertical plane orthogonal to the surface of the sample and containing the optical axis. The focusing angle control member may include, for example, a slit member having a slit for transmitting only a part having any width of the characteristic X-rays focused by the first X-ray optical element.

The focusing angle of the characteristic X-rays is reduced by the focusing angle control member, whereby spherical aberration of an optical system constituting the X-ray irradiation unit can be reduced, and thus the focusing area of X-rays can be reduced.

It is preferable that the X-ray irradiation unit is configured so that respective components of the X-ray tube, the X-ray optical element, and the slit member are incorporated in an unit main body that is rotatably installed in the first rotation member. By integrally incorporating the respective components in the unit main body as described above, an installation work into the first rotation member is facilitated, and it is possible to easily and flexibly deal with various manners of the X-ray inspection.

Furthermore, it is preferable that the X-ray detector comprises a one-dimensional X-ray detector or a two-dimensional X-ray detector.

The high-resolution focusing X-rays with a small focusing angle obtained by the aforementioned X-ray optical element is irradiated to the sample while the focusing angle is further limited to a small value by the focusing angle control member, and X-rays reflected from the sample are detected by the one-dimensional X-ray detector or the two-dimensional X-ray detector, so that a rapid and highly accurate X-ray thin film inspection method can be executed on a semiconductor wafer flowing through a semiconductor manufacturing line.

Next, an X-ray thin film inspection method according to the present invention that targets a semiconductor wafer flowing through a semiconductor manufacturing line as an inspection target sample and inspects a thin film formed on a surface of the semiconductor wafer by using the X-ray inspection device having the aforementioned configuration, presets a unique point which can be recognized on the surface of: the semiconductor wafer by image observing means, sets position information of a site-under-measurement of an X-ray thin film inspection with reference to the unique point, and includes the following steps (a) to (c).

(a) a step of recognizing the unique point set on the surface of the semiconductor wafer placed on the sample stage by the image observing means;

(b) a step of controlling the positioning mechanism to move the sample stage based on the position information of the site-under-measurement with reference to the unique point recognized by the image observing means, and position the site-under-measurement to the inspection position; and (c) a step of focusing characteristic X-rays from the X-ray irradiation unit to the inspection position to perform an X-ray inspection.

As described above, according to the X-ray thin film inspection method of the present invention, it is possible to perform a suitable X-ray inspection in-line on a semiconductor wafer flowing through a semiconductor manufacturing line by using the aforementioned X-ray thin film inspection method.

Next, in addition to the aforementioned configuration, it is preferable that the X-ray inspection device of the present invention further includes rocking curve measuring means for executing a rocking curve measuring method on a sample in which a thin film crystal is epitaxially grown on a substrate crystal.

Here, the rocking curve measuring means has a function of executing the following operations (i) to (iv) (steps 1 to 4):

(i) selecting a crystal lattice plane as a measurement target for the sample (step 1);
(ii) arranging the X-ray irradiation unit and the X-ray detector at angular positions for the sample surface determined based on a Bragg angle of the substrate crystal in the sample for the selected crystal lattice plane (step 2);
(iii) irradiating the sample surface with X-rays from the X-ray irradiation unit, and detecting a reflection angle and intensity of diffracted X-rays reflected from the sample by the X-ray detector (step 3); and
(iv) obtaining a rocking curve based on the reflection angle and intensity of the diffracted X-rays detected by the X-ray detector, and analyzing data on the rocking curve (step 4).

The rocking curve measuring means may be configured to have a function of executing the following operations (I) to (VI) (steps A to F):

(I) selecting two equivalent asymmetric reflection crystal lattice planes for the sample (step A);
(II) arranging the X-ray irradiation unit and the X-ray detector at angular positions for the sample surface determined based on a Bragg angle of the substrate crystal in the sample for one of the selected crystal lattice planes (step B);
(III) irradiating the sample surface with X-rays from the X-ray irradiation unit, and detecting a reflection angle and intensity of diffracted X-rays reflected from the sample by the X-ray detector (step C);
(IV) arranging the X-ray irradiation unit and the X-ray detector at angular positions for the sample surface determined based on a Bragg angle of the substrate crystal in the sample for the other selected crystal lattice plane (step D);
(V) irradiating the sample surface with X-rays from the X-ray irradiation unit, and detecting a reflection angle and intensity of diffracted X-rays reflected from the sample by the X-ray detector (step E); and
(VI) obtaining a rocking curve based on the reflection angle and intensity of the diffracted X-rays detected by the X-ray detector, and analyzing data on the rocking curve (step F).

Furthermore, the rocking curve measuring means may be configured to further have a function of executing the following operations (VI-I) to (VI-IV) (steps F-1 to F-4) in the operation (VI):

(VI-I) determining an angular difference between a diffraction peak in the substrate crystal of the sample and diffraction peaks of two equivalent asymmetric reflections in the thin film crystal of the sample (step F-1);
(VI-II) calculating a lattice constant of the thin film crystal of the sample from the angular difference of the diffraction peaks determined by the operation (VI-I) (step F-2);
(VI-III) calculating, from a known elastic constant of the thin film crystal of the sample and the calculated lattice constant, at least one of a strain of the thin film crystal, a lattice constant under a state where a stress of the thin film crystal is released, a composition of the thin film crystal and the stress of the thin film crystal (step F-3); and
(VI-IV) outputting a calculation result obtained by the operation (VI-III) (step F-4).

Here, in the operation (iii) or the operation (v), it is preferable that a focusing angle of X-rays to be irradiated on the sample surface from the X-ray irradiation unit is set to 2° or more by the focusing angle control member, the sample surface is irradiated with X-rays in an angle range of 2° or more, the X-ray detector comprises a one-dimensional X-ray detector or a two-dimensional X-ray detector, and diffracted X-rays from the sample are made incident to the X-ray detector to detect a reflection angle and intensity of the diffracted X-rays.

The X-ray irradiation unit may be configured to oscillate in a virtual vertical plane orthogonal to the surface of the sample and containing the optical axis to irradiate the sample surface with X-rays.

There is no problem as long as the focusing X-rays emitted from the X-ray irradiation unit have uniform intensity over all the angular range, but actually, it is inevitable that the intensity becomes non-uniform even when it is slight. Therefore, by oscillating the X-ray irradiation unit, it is possible to equalize the X-ray intensity distribution with respect to the incident angle and to realize a highly accurate rocking curve measuring method.

Furthermore, the X-ray detector and the X-ray irradiation unit may be scanned interlockingly with each other within a virtual vertical plane orthogonal to the surface of the sample and containing the optical axis to measure diffracted X-rays reflected from the sample by a scanning method based on a TDI (Time Delay Integration) mode.

By scanning the X-ray irradiation unit and the X-ray detector interlockingly with each other in such a large angle range, it is possible to equalize the intensity of X-rays to be irradiated onto the sample and to realize the high-accuracy rocking curve measuring method when the intensity distribution with respect to the incident angle of the focusing X-rays emitted from the X-ray irradiation unit is large or even when the peak angle of the diffracted X-rays from the substrate crystal is greatly apart from the peak angle of the diffracted X-rays from the thin film crystal.

BRIEF DESCRIPTION OF THE DRAWINGS

FIG. 3A is a front view schematically showing the configuration of an X-ray irradiation unit according to the embodiment of the present invention, and FIG. 3B is also a bottom view thereof.

FIG. 4 is a perspective view of the X-ray irradiation unit shown in FIGS. 3A and 3B.

FIG. 5A is an enlarged front view showing a first X-ray optical element and a second X-ray optical element included in the X-ray irradiation unit shown in FIGS. 3A and 3B, and 4, and FIG. 5B is also a bottom view thereof.

FIG. 16 is a schematic diagram showing a scanning method of the X-ray detector based on a TDI mode.

DESCRIPTION OF REFERENCE SIGNS

10: sample stage, 20: positioning mechanism, 30: goniometer, 31: goniometer main body, 32: first rot at ion arm, second rotation arm, 40: X-ray irradiation unit, 41: X-ray tube, 42: first X-ray optical element, 43: second X-ray optical element, 44: focusing slit, 50: X-ray detector, 60: optical microscope 100: central processing unit, 101: XG controller, 102: image recognition circuit, 103: focus controller, 104: positioning controller, 106: goniometer controller, 107: counting control circuit, 110: storage unit, 201: operating unit, 202: display unit, 203: communication unit

BEST MODES FOR CARRYING OUT THE INVENTION

An embodiment of the present invention will be described in detail hereunder with reference to the drawings.

[Basic Configuration of X-Ray Inspecting Device]

Figure 1:
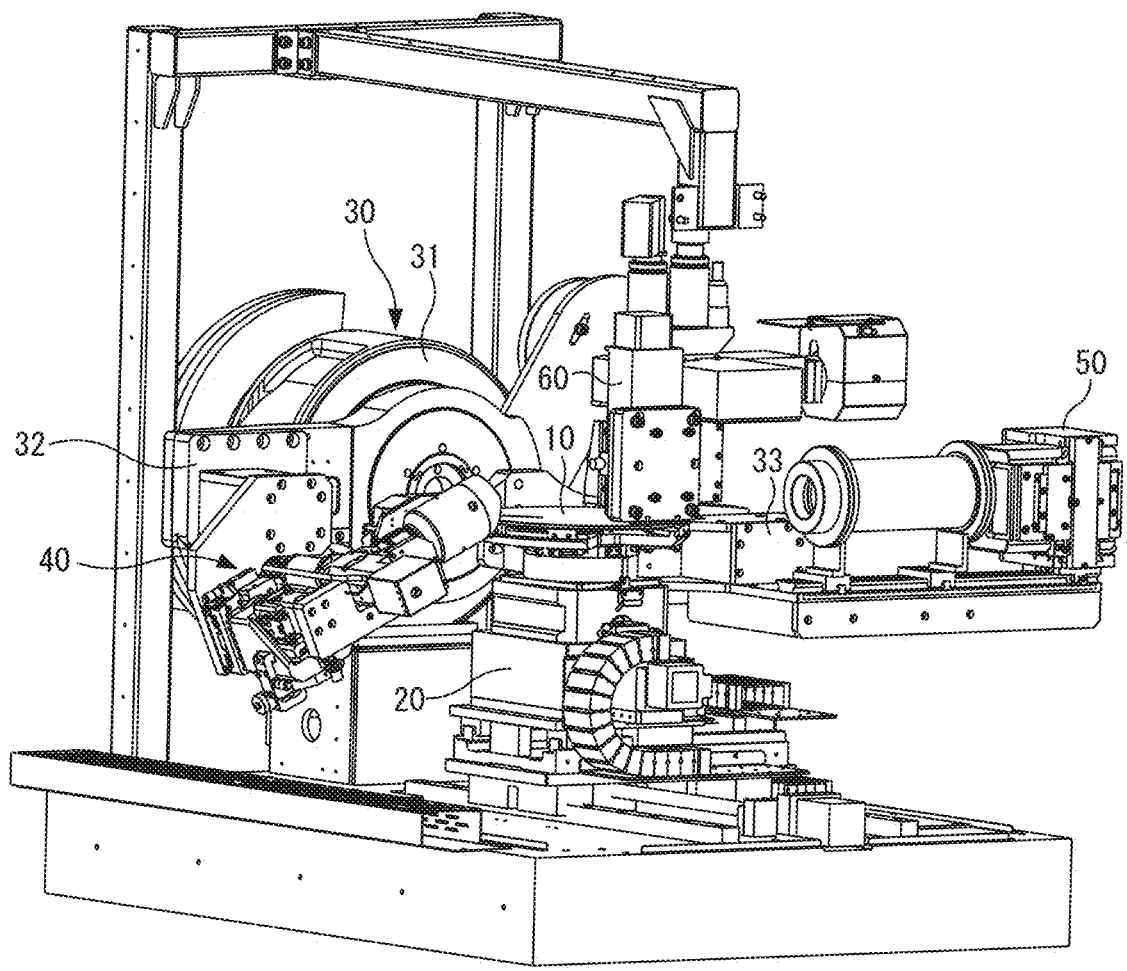
FIG. 1 is a perspective view showing the overall configuration of an X-ray inspection device according to an embodiment of the present invention.
Figure 2A:
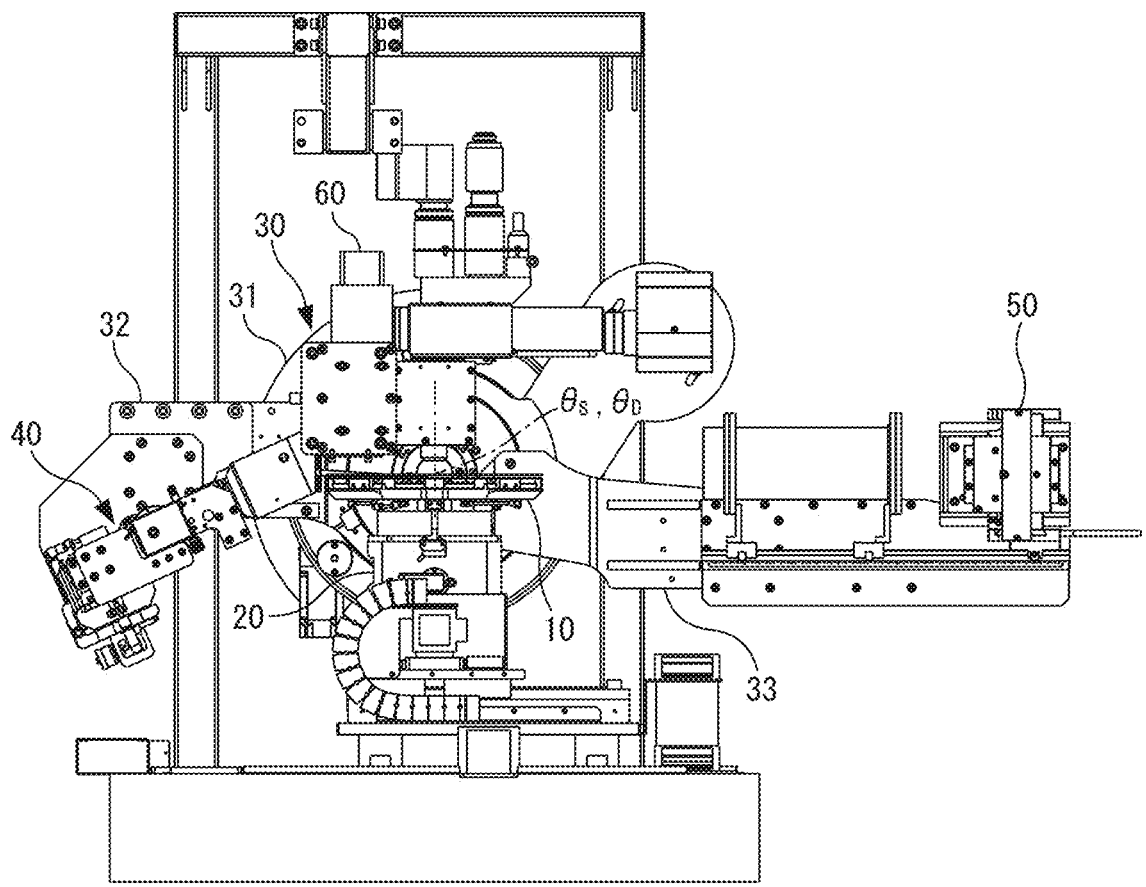
FIG. 2A is a front view showing the overall configuration of the X-ray inspection device according to the embodiment of the present invention.

FIG. 1 is a perspective view showing the overall configuration of an X-ray inspection device, and FIG. 2A is a front view of the X-ray inspection device.

The X-ray inspection device includes a sample stage 10, a positioning mechanism 20, a goniometer 30, an X-ray irradiation unit 40, an X-ray detector 50, and an optical microscope 60 including a COD camera and the like.

A semiconductor wafer (sample) as an inspection target is placed on an upper surface of the sample stage 10, and driven by the positioning mechanism 20. The positioning mechanism 20 includes a horizontal movement mechanism which is freely movable in two orthogonal directions (X and F directions) in a horizontal plane, an elevation mechanism which is freely movable in a vertical direction (Z direction) orthogonal to the horizontal plane, and an in-plane rotation mechanism, and has a function of moving the sample stage 10 in the X, F, and Z directions and rotating the sample stage 10 in a plane so that any site-under-measurement on the semiconductor wafer placed on the upper surface of the sample stage 10 is positioned at a focusing position of irradiated X-rays while set in a predetermined oriented state.

The goniometer 30 includes a goniometer main body 31 and first and second rotation arms (rotation members) 32 and 33 installed in the goniometer main body 31. Each of the rotation arms 32 and 33 rotates along a virtual plane perpendicular to the upper surface of the sample stage around an axis ($\theta_s$-axis, $\theta_D$-axis) vertical to the paper surface of FIG. 2A. Here, the respective rotation arms 32 and 33 are rotated while the rotation angle of the first rotation arm 32 from the horizontal position thereof is set to $\theta_s$ and the rotation angle of the second rotation arm 33 from the horizontal position thereof is set to $\theta_D$.

The X-ray irradiation unit 40 is installed on the first rotation arm 32 rotating around the $\theta_s$-axis. The X-ray detector 50 is installed on the second rotation arm 33 rotating around the $\theta_D$-axis.

The X-ray irradiation unit 40 has a function of monochromatizing X-rays generated from the X-ray tube into characteristic X-rays of a specific wavelength, and also focusing the X-rays on one place.

A position to which characteristic X-rays from the X-ray irradiation unit 40 are irradiated is an inspection position, and a site-under-measurement of a sample placed on the upper surface of the sample stage 10 is positioned at this inspection position by the positioning mechanism 20. It is to be noted that the inspection position is set on the same plane as the surface of the sample placed on the sample stage 10.

The X-ray detector 50 is used for an X-ray thin film inspection such as X-ray reflectivity measurement (XRR), X-ray diffraction measurement (XRD), rocking curve measurement, and reciprocal space map measurement (RSM). According to the X-ray reflectivity measurement, the measurement precision of an angstrom order in film thickness is achieved because interference between reflected X-rays on the film surface and reflected X-rays at the interface between the film and the substrate is measured to derive film thickness and density.

For example, an avalanche photodiode (APD) having a broad dynamic range to incident X-rays may be used as the X-ray detector 50. In addition, by using a one-dimensional X-ray detector or two-dimensional ray detector, the X-ray reflectivity measurement, the rocking curve measurement, the reciprocal space map measurement, etc. which are based on a TDI (Time Delay Integration) mode or a still (still) mode can be performed. Incidentally, the TDI mode and the still mode in the X-ray thin film inspection are described in the aforementioned Non-Patent Document 1.

The device may be configured so that a detector exchanging mechanism is incorporated into the second rotation arm 33, and various kinds of X-ray detectors such as APD, a one-dimensional X-ray detector, a two-dimensional X-ray detector, a scintillation counter, etc. are mounted and allowed to be used while switching these X-ray detectors to one another by the detector exchanging mechanism.

The optical microscope 60 is arranged at a position displaced in the horizontal direction from the inspection position to avoid interference with the X-ray irradiation unit 40 and the X-ray detector 50.

A site-under-measurement of a sample (for example, a semiconductor wafer) placed on the sample stage 10 is arranged at a lower position of the optical microscope 60 by moving the sample stage 10 by the positioning mechanism 20. Then, by moving the sample stage 10 in the horizontal direction from this position to the inspection position, the site-under-measurement of the sample (for example, the semiconductor wafer) is positioned at the inspection position.

Figure 2B:
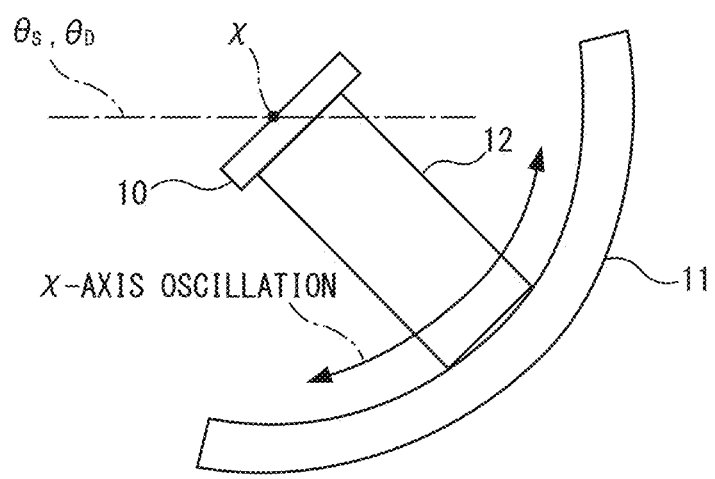
FIG. 2B is a side view schematically showing a configuration example added with a mechanism for oscillating a sample stage around a X-axis.

Furthermore, as schematically shown in FIG. 2B, the X-ray inspection device may be configured to be added with a $\chi$-axis oscillating mechanism for oscillating the sample stage 10 around a $\chi$-axis. Here, the $\chi$-axis is an axis orthogonal to the $\theta_S$-axis and the $\theta_D$-axis (that is, an axis extending in the right-and-left direction in FIG. 2A) on the surface of the sample S placed on the sample stage 10. The intersection point of the $\theta_S$-axis, the $\theta_D$-axis, and the $\chi$-axis is positioned on an inspection position f described later.

The $\chi$-axis oscillating mechanism is configured so that a oscillating table 12 is incorporated in a curved guide 11 so as to be capable of freely oscillating, and the oscillating table 12 oscillates along the curved guide 11 with driving force from a drive motor (not shown). The sample stage 10 provided at the upper portion of the oscillating table 12 rocks integrally with the oscillating table 12.

By adding the $\chi$-axis oscillating mechanism, it is possible to perform a rocking curve measurement targeting symmetric reflection on a crystal lattice plane of (002), (101) and a reciprocal space map measurement targeting symmetric reflection on a crystal lattice plane of (204) for thin films of AlGaN (aluminum galium nitride) and AlInN (aluminum indium nitride). It is also possible to measure dispersion (twist distribution) in lattice orientation in the in-plane direction of the sample. Furthermore, it is possible to perform both an in-plane diffraction measurement and an out-of-plane diffraction measurement.

[Configuration Example of X-Ray Irradiation Unit]

Next, the X-ray irradiation unit will be described in detail with reference to FIGS. 3 to 6.

The X-ray irradiation unit 40 shown in FIGS. 3 to 6 includes an X-ray tube 41, a first X-ray optical element 42, a second X-ray optical element 43, and a focusing slit 44 (slit member) as constituent elements. These constituent elements are incorporated in a unit main body (not shown). The unit main body is configured to be small in dimension and shape so that it is installable in the first rotation arm 32.

Figure 6A:
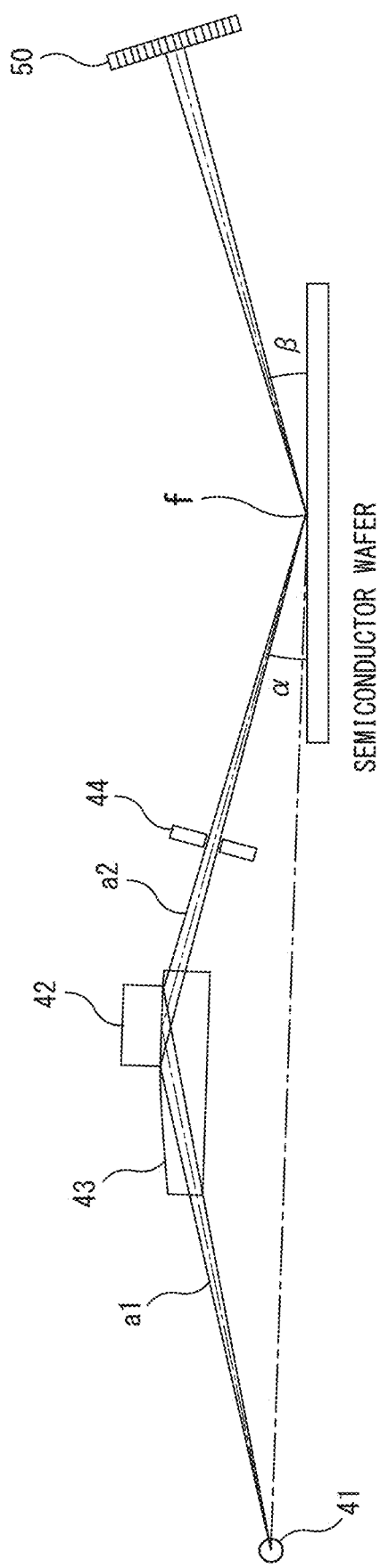
FIG. 6A is a front view schematically showing a path of X-rays irradiated to an inspection surface of a semiconductor wafer from the X-ray irradiation unit, and a path of diffracted X-rays which is reflected from the inspect ion surface and incident into an X-ray detector.

The focusing slit 44 is shown only in FIG. 6, and omitted in FIGS. 3 and 4.

For example, a micro focus X-ray tube having an electron beam focus size of about $\phi 100$ μm on a target may be used as the X-ray tube 41. Copper (Cu), molybdenum (Mo), iron (Fe), cobalt (Co), tungsten (W), chromium (Cr), silver (Ag), gold (Au) or the like may be used as a target material as required.

Particularly when copper (Cu) is used as the target material, only characteristic X-rays of Cu-K$\alpha$1 having high angular resolution can be extracted by first and second X-ray optical elements 42 and 43 described later. Accordingly, X-ray thin film inspection can be performed with excellent throughput by irradiating a sample with the characteristic X-rays of Cu-K$\alpha$1.

The first and second X-ray optical elements 42 and 43 have a function of receiving X-rays a1 radiated from the X-ray tube 41, extracting only characteristic X-rays of a specific wavelength and focusing the extracted characteristic X-ray a2 on the surface or a sample placed on the sample stage 10.

Figure 6B:
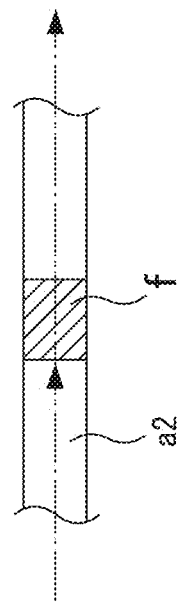
FIG. 6B is an enlarged plan view of an "inspection position f" portion of FIG. 6A.

As shown in FIGS. 3 to 5, the first X-ray optical element 42 and the second X-ray optical element 43 are arranged so that surfaces 42a and 43a thereof which receive X-rays and reflect characteristic X-rays (hereinafter merely referred to as "surfaces") are orthogonal to each other. As shown in FIG. 6B, the first X-ray optical element 42 and the second X-ray optical element 43 focus the characteristic X-rays a2 of the specific wavelength so that the characteristic X-rays a2 form a square minute spot on the surface of the sample placed on the sample stage 10. FIG. 6B is an enlarged plan view schematically showing a position at which the characteristic X-rays a2 are focused on the surface of the sample (semiconductor wafer).

In the present embodiment, the first X-ray optical element 42 and the second X-ray optical element 43 are arranged in a side-by-side manner in which one sides thereof are in contact with each other. However, the present invention is not limited to this arrangement, and they may be arranged in an in-series manner called as Kirkpatrick-Baez (KB).

A position at which the characteristic X-rays reflected and extracted by the first and second X-ray optical elements 42 and 43 are focused on the surface of the sample placed on the sample stage 10 is an inspection position f. In order to focus the characteristic X-rays on the inspection position f as described above, the respective surfaces 42a and 43a of the X-ray optical elements 42 and 43 are formed to be concavely curved.

Here, the first X-ray optical element 42 focuses the characteristic X-rays a2 such that the height of the characteristic X-rays a2 decreases within a virtual vertical plane that is orthogonal to the surface of the sample placed on the sample stage 10 and contains an optical axis. A focusing direction in which the height decreases will be hereunder referred to as "vertical direction". The surface 42a of the first X-ray optical element 42 is arranged to be orthogonal to the virtual vertical plane in order to focus the characteristic X-rays in the vertical direction.

On the other hand, the second X-ray optical element 43 focuses the characteristic X-rays a2 such that the width of the characteristic X-rays a2 decreases within a virtual plane which is orthogonal to the virtual vertical plane and contains the optical axis. A focusing direction in which the width decreases will be hereunder referred to as "horizontal direction". The surface 43a of the second X-ray optical element 43 is arranged to be orthogonal to the virtual plane in order to focus the characteristic X-rays in the horizontal direction.

Furthermore, the first X-ray optical element 42 is constituted by a crystal material having high crystallinity. In other words, the first X-ray optical element 42 is constituted by a crystal material having an extremely small inherent rocking curve width (that is, angular range in which a collimated beam can be reflected). Crystal materials corresponding to perfect crystals having extremely little lattice defect and impurities correspond to the crystal material having the extremely small inherent rocking curve width as described above.

In the present embodiment, the first X-ray optical element 42 is constituted by a crystal material having an inherent rocking curve width of 0.06° or less. By using the characteristic X-rays a2 extracted from the crystal material described above, high angular resolution of 0.06° or less can be obtained in X-ray thin film measurements.

For example, Ge (111) or Si (111) may be used as the crystal material. When Ge (1 1 1) is used, a rocking curve width of 0.06° or less is obtained. In addition, when Si (1 1 1) is used, a rocking curve width of 0.02° or less is obtained.

Furthermore, according to the first X-ray optical element 42, it is possible to control the focusing angle in the vertical direction so that the height dimension of the characteristic X-rays is equal to 100 micrometers or less at the inspection position.

In addition, the first X-ray optical element 42 has a function of extracting only characteristic X-rays of a specific wavelength and monochromatizing the extracted characteristic X-rays.

Furthermore, the second X-ray optical element 43 is constituted by a multilayer mirror. The second X-ray optical element 43 has a function of extracting only characteristic X-rays of a specific wavelength and monochromatizing the extracted characteristic X-rays. Here, the second X-ray optical element 43 is adjusted so as to extract the characteristic X-rays having the same wavelength as the characteristic X-rays extracted by the first X-ray optical element 42.

As enlarged and viewed in FIG. 5, X-rays b1 which are emitted from the X-ray tube 41 and incident to the surface 43*a* of the second X-ray optical element 43 are monochromatized and reflected by the X-ray optical element 43, travel so as to be focused in the horizontal direction, and then are incident to the surface 42*a* of the first X-ray optical element 42. Then, X-rays b2 incident to the surface 42*a* of the first X-ray optical element 42 are monochromatized and reflected by the X-ray optical element 42, travel so as to be focused in the vertical direction, and are irradiated to the inspection position f shown in FIG. 3.

On the other hand, X-rays c1 which are emitted from the X-ray tube 41 and incident to the surface 42*a* of the first X-ray optical element 42 are monochromatized and reflected by the X-ray optical element 42, travel so as to be focused in the vertical direction, then are incident to the surface 43*a* of the second X-ray optical element 43. Then, X-rays c2 incident to the surface 43*a* of the second X-ray optical element 43 travel so as to be focused in the horizontal direction, and then are irradiated to the inspection position f shown in FIG. 3.

As described above, X-rays a1 emitted from the X-ray tube 41 are reflected once by each of the surface 42*a* of the first X-ray optical element 42 and the surface 43*a* of the second X-ray optical element 43, and during this process, only characteristic X-rays a2 having a specific wavelength are extracted, and the characteristic X-rays a2 are focused on the inspection position f.

Incidentally, the aforementioned Patent Document 2 and Patent Document 3 disclose an X-ray beam adjustment system configured by combining a perfect crystal and multilayer optical components. However, these documents do not disclose a configuration which is optimized for an X-ray inspection device using a semiconductor wafer as an inspection target sample.

The focusing slit 44 is arranged so as to partially shield the characteristic X-rays a2 reflected by the first and second X-ray optical elements 42 and 43 from both sides in the vertical direction described above. The focusing slit 44 has a function of restricting the focusing in the vertical direction of the focusing X-rays a2 reflected by the first and second X-ray optical elements 42 and 43.

According to the X-ray inspection device in which X-ray irradiation unit 40 having the aforementioned configuration is installed on the first rotation arm 32, X-rays can be focused on a minute area by the first X-ray optical element 42, the second X-ray optical element 43 and the focusing slit 44. Accordingly, it is possible to perform a thin film measurement by irradiating X-rays to an extremely minute inspection area on the surface of a semiconductor wafer. In addition, since the first X-ray optical element 42 is constituted by a crystal material having extremely small inherent rocking curve width, extremely high angular resolution can be obtained in the X-ray thin film measurement by using characteristic X-rays a2 extracted with the crystal material as described above.

[Control of X-Ray Inspection Device]

Figure 7:
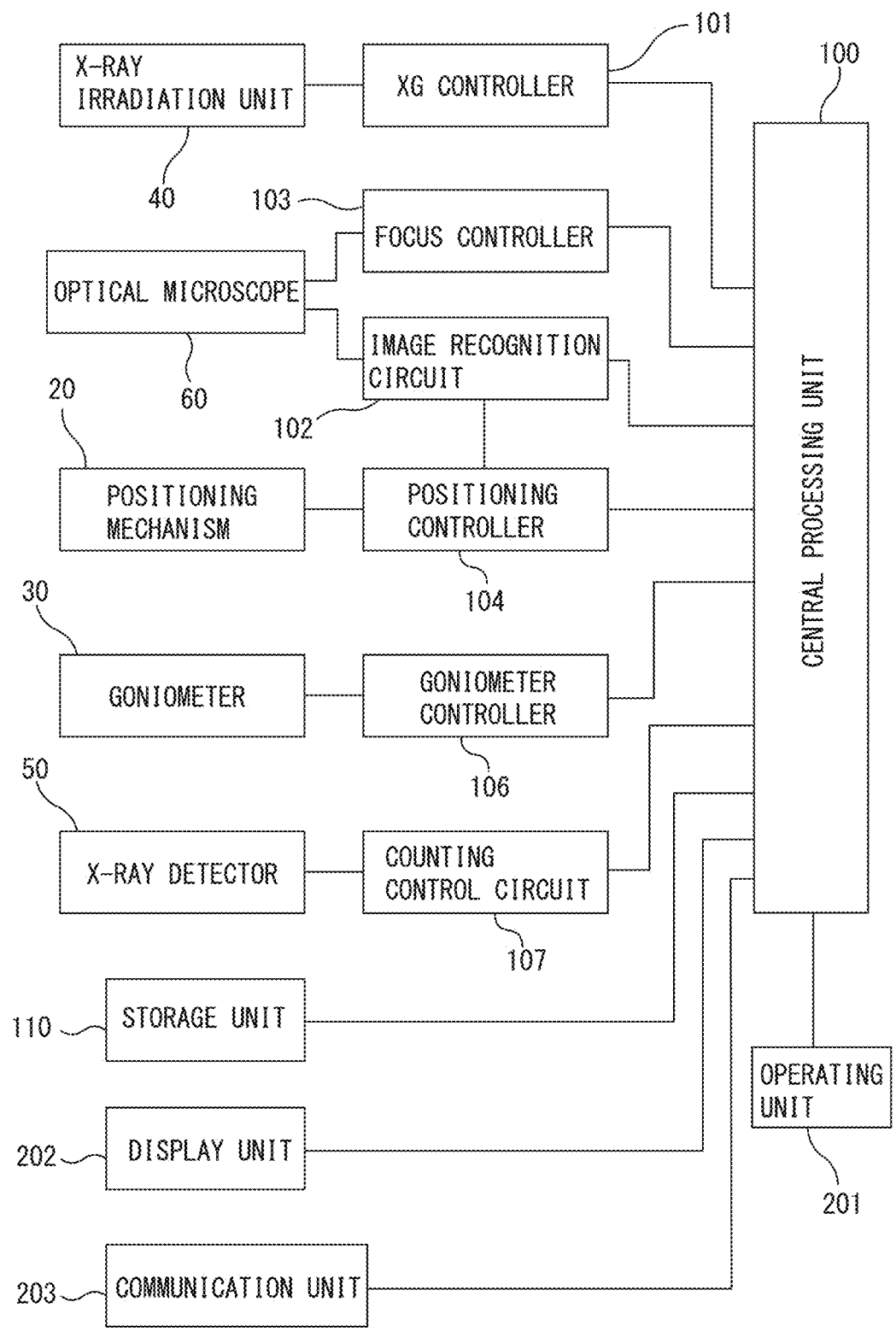
FIG. 7 is a block diagram showing a control system of the X-ray inspection device according to the embodiment of the present invention.

FIG. 7 is a block diagram showing a control system of the X-ray inspection device.

The control of the X-ray irradiation unit 40 is executed by an XG controller 101.

An image of the sample captured by the optical microscope 60 is subjected to image recognition in an image recognition circuit 102. The optical microscope 60 and the image recognition circuit 102 constitute image observing means for observing an image of the sample placed on the sample stage 10. The focal position of the optical microscope 60 is adjusted by a focus controller 103.

A positioning controller 104 controls the operation of the positioning mechanism 20 based on the image of the sample which is captured by the optical microscope 60 and recognized by the image recognition circuit 102.

The goniometer 30 is controlled to be driven by the goniometer controller 106.

The respective components of the XG controller 101, the image recognition circuit 102, the focus controller 103, the positioning controller 104, and the goniometer controller 106 operate based on setting information transmitted from a central processing unit (CPU) 100. Here, the setting information is stored as a recipe in the storage unit 110 in advance, and the central processing unit (CPU) 100 reads out the setting information and outputs it to the respective components.

The X-ray detector 50 is controlled by a counting control circuit 107.

The X-ray inspection device is provided with an operating unit 201 including a keyboard, a mouse, etc. for inputting various settings necessary for the operation of the device by an operator. Furthermore, the X-ray inspection device includes a display unit 202 constituted by a liquid crystal display or the like, and a communication unit 203 for performing data communication via a network.

[Procedure of Executing X-Ray Thin Film Inspection Method]

Figure 8:
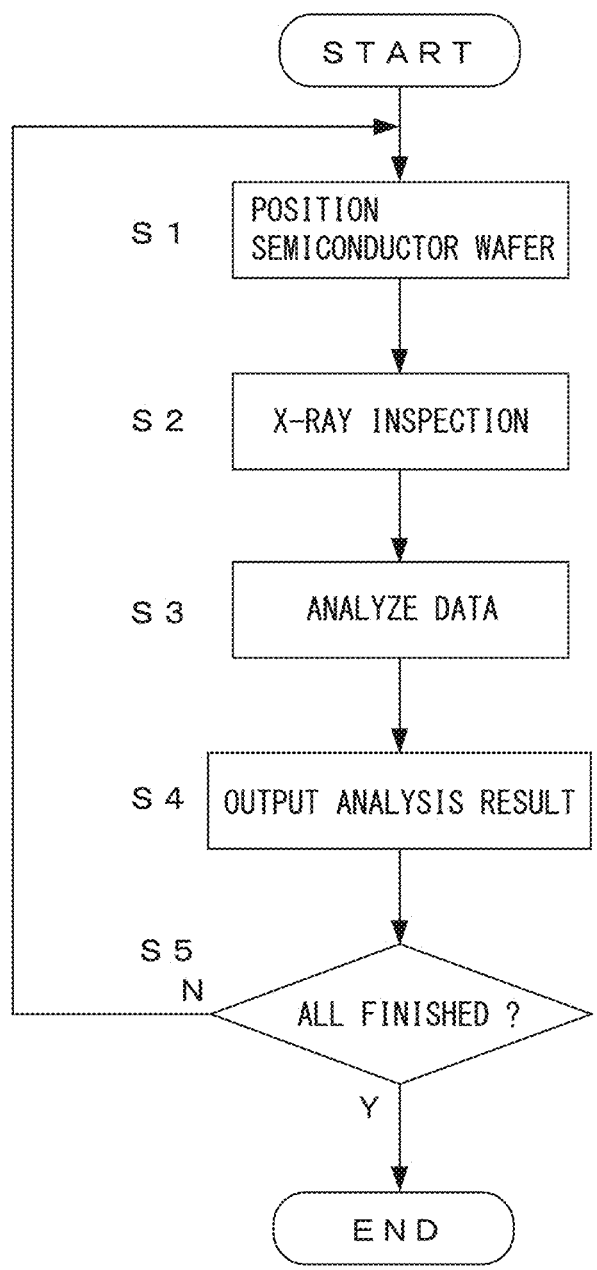
FIG. 8 is a control flowchart of the X-ray inspection device according to the embodiment of the present invention.

FIG. 8 is a flowchart showing a procedure of executing ah X-ray thin film inspection method for a semiconductor wafer as an inspection target.

Software for executing an X-ray thin film inspection is stored in a storage unit 110 in advance, and the central processing unit (CPU) 100 executes the following processing steps according to the software.

After a semiconductor wafer which is an inspection target sample is placed on the sample stage 10, a site-under-measurement of a semiconductor wafer is first positioned at an inspection position (step S1).

Here, a unique point on the surface of the semiconductor wafer which can be specified by the image recognition circuit 102 based on image information from the optical microscope 60 is set as a recipe in the storage unit 110 in advance. Position information of the site-under-measurement is beforehand set as a recipe in the storage unit 110 with the unique point as a basis. As the unique point is set a site which can be recognized without doubt on the recognition by the image recognition circuit 102, for example, a characteristic pattern shape or the like formed on the surface of the semiconductor wafer.

Based on the image information from the optical microscope 60, the image recognition circuit 102 recognizes and specifies the unique point set on the surface of the semiconductor wafer placed on the sample stage 10 from the image information from the optical microscope 60.

Next, with the unique point recognized by the image recognition circuit 102 as a basis, the positioning controller 104 controls to drive the positioning mechanism 20 based on the preset position information of the site-under-measurement. The positioning mechanism 20 moves the sample stage 10 in two horizontal directions (X-Y directions) and a height direction (Z direction) to place the site-under-measurement of the semiconductor wafer at the inspection position.

After performing the positioning of the site-under-measurement of the semiconductor wafer as described above, X-ray inspection is performed based on any of the X-ray reflectivity measurement (XRR), the X-ray diffraction measurement (XRD), the rocking curve measurement and the reciprocal space map measurement (RSM) (step S2), and the central processing unit 100 analyzes inspection data (step S3), and outputs an analysis result (step S4).

The aforementioned respective steps are executed for all site-under-measurements set on the semiconductor wafer (step S5), and the inspection is finished after the inspection of all the site-under-measurements has been completed.

[Rocking Curve Measuring Method]

Next, a rocking curve measuring method using the X-ray inspection device having the aforementioned configuration will be described in detail.

The rocking curve measuring method is known as an analysis technique for obtaining the lattice constant of a thin film crystal epitaxially grown on a substrate crystal, for example.

Figure 9A:
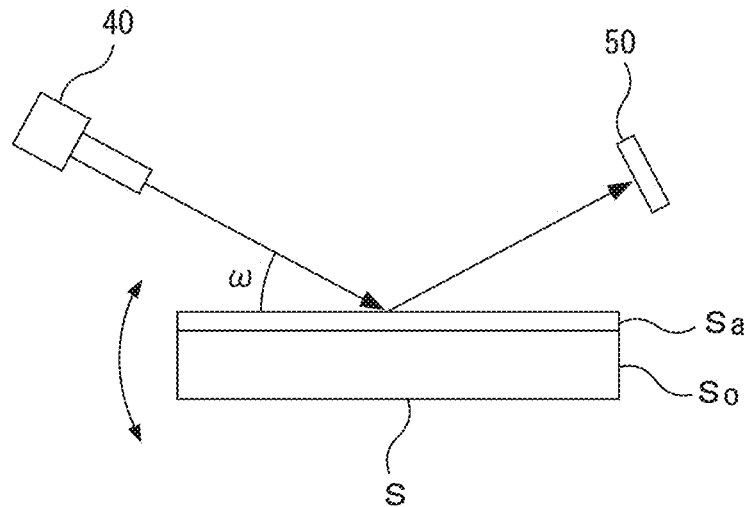
FIG. 9A is a schematic diagram showing an outline of a conventional rocking curve measuring method.

As shown in FIG. 9A, the rocking curve measuring method which has been known in the past changes an incident angle ω of X-rays to a sample S by scanning the sample S relatively to incident X-rays (monochromatic collimated X-rays) by only a minute angle. The sample S as a measurement target is, for example, a semiconductor wafer obtained by epitaxially growing a thin film (crystal) Sa on a substrate crystal So.

Figure 9B:
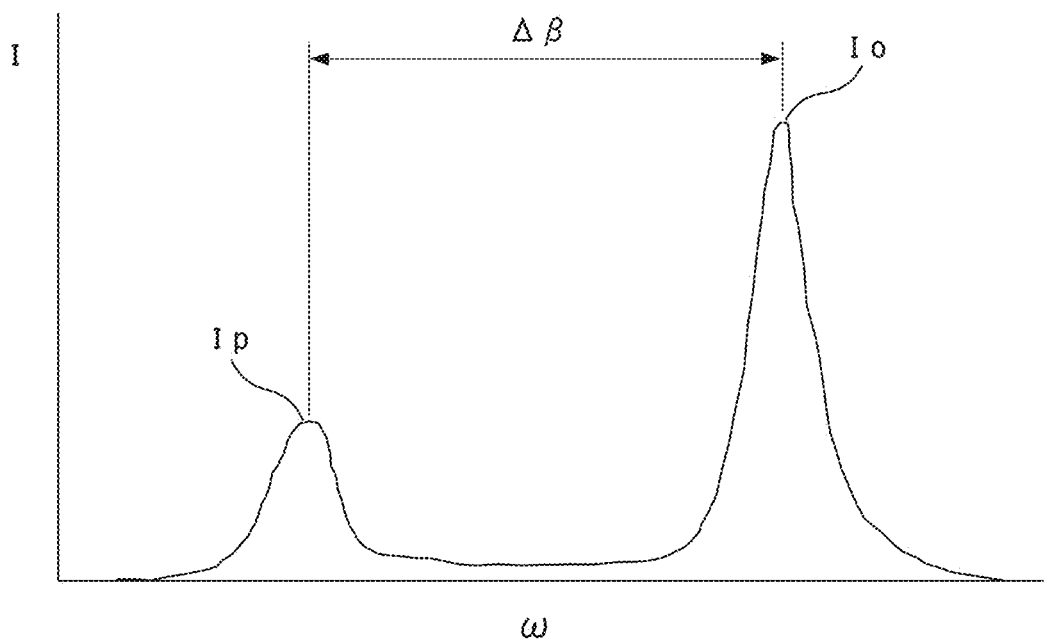
FIG. 9B is a diagram showing an example of a rocking curve.

By changing the incident angle ω of the X-rays to the sample S as described above, the X-rays are reflected (diffracted) by the substrate crystal So when the incident angle coincides with the Bragg angle of the substrate crystal So, and the X-rays are reflected (diffracted) by the thin film (crystal) Sa when the incident angle coincides with the Bragg angle of the thin film (crystal) Sa. The X-rays reflected from the substrate crystal So and the thin film Sa are detected by the X-ray detector 50, and a profile of the incident angle vs. the intensity of the X-rays is obtained, thereby obtaining a rocking curve as shown in FIG. 9B.

A peak intensity Io of the diffracted X-rays reflected from the substrate crystal and a peak intensity Ip of the diffracted X-rays reflected from the thin film appear separately from each other in the rocking curve. When an X-ray incident angle (Bragg angle) at which the peak intensity Io of the diffracted X-rays from the substrate crystal appears is known, the lattice constant of the thin film can be relatively determined from the difference Δβ between the known X-ray incident angle and an X-ray incident angle at which the peak intensity Ip of the diffracted X-rays from the thin film appears.

Since the X-ray inspection device according to the present embodiment can irradiate the sample S with monochromatic X-rays which are focused on a minute area with high resolution by the X-ray irradiation unit 40, the rocking curve measuring method can be performed in a short time by irradiating the sample S at once with a bundle of X-rays in an focusing angle range without scanning the X-ray incident angle $\theta_s$.

Generally, in the rocking curve measuring method targeting the sample S in which the thin film crystal is epitaxially grown on the substrate crystal, the incident angle ω of the X-rays to the sample surface is changed in a range of 2° or more. Accordingly, it is preferable that X-rays to be irradiated from the X-ray irradiation unit 40 to the sample surface are set to have a focusing angle of 2° or more by the focusing slit 44, and the sample surface is irradiated with X-rays in the angle range of 2° or more.

[Rocking Curve Measuring Method Targeting Two Equivalent Asymmetric Reflection Crystal Lattice Planes]

Furthermore, the X-ray inspection device according to the present embodiment is incorporated with means for performing the rocking curve measuring method targeting two equivalent crystal lattice planes (that is, asymmetric reflection crystal lattice planes) which are not parallel to the surface. This rocking curve measuring means is stored as software in the storage unit 110 of FIG. 7, and is executed by the central processing unit (CPU) 100.

The rocking curve measuring means incorporated in the X-ray inspection device executes the rocking curve measuring method on, for example, each of the crystal lattice planes (1 1 5) (−1 −1 5) of asymmetrical reflection for a Si (silicon) substrate crystal So and a GeSi (silicon germanium) thin film Sa with a semiconductor wafer as a sample S in which the GeSi (silicon germanium) thin film Sa is epitaxially grown on the surface of the Si (silicon) substrate crystal So. It is needless to say that the targeted asymmetric reflection crystal lattice planes are not limited to (1 1 5) (−1 −1 5). The crystal lattice plane may be selected such that the peak of the GeSi thin film Sa is not excessively close to the peak of the Si substrate crystal So and $\theta_s$, $\theta_D$<85° is satisfied.

Figure 10A:
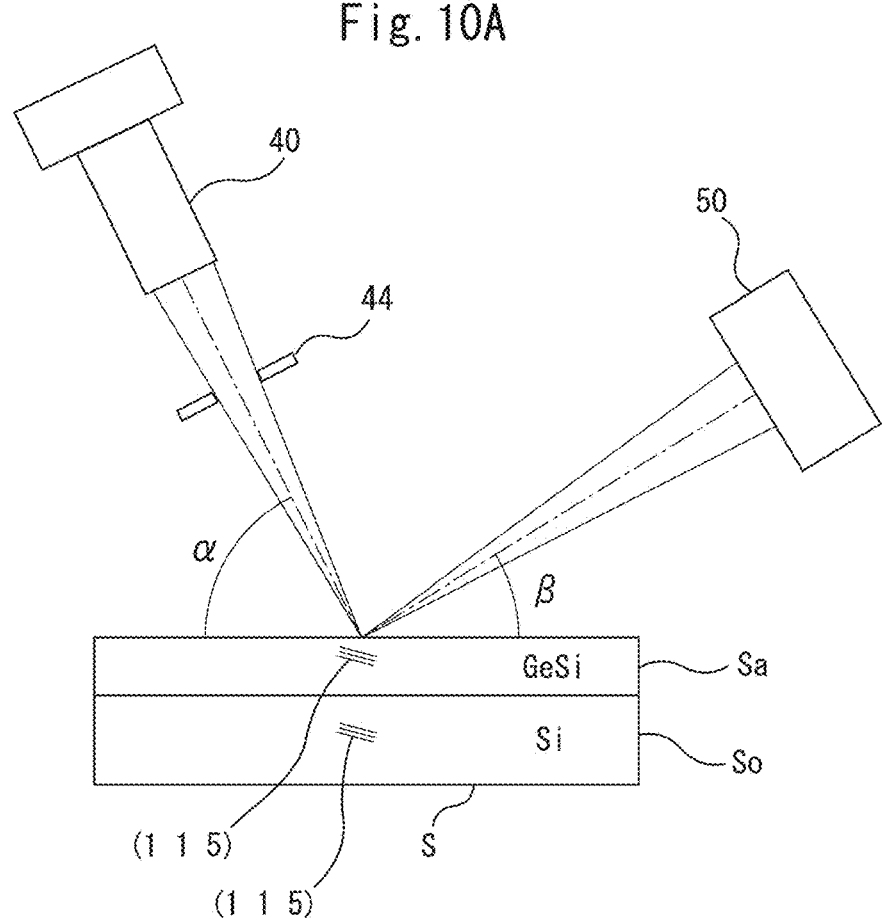
FIGS. 10A and 10B are schematic diagrams showing an outline of a rocking curve measuring method by rocking curve measuring means incorporated in the X-ray inspection device according to the embodiment of the present invention.
Figure 10B:
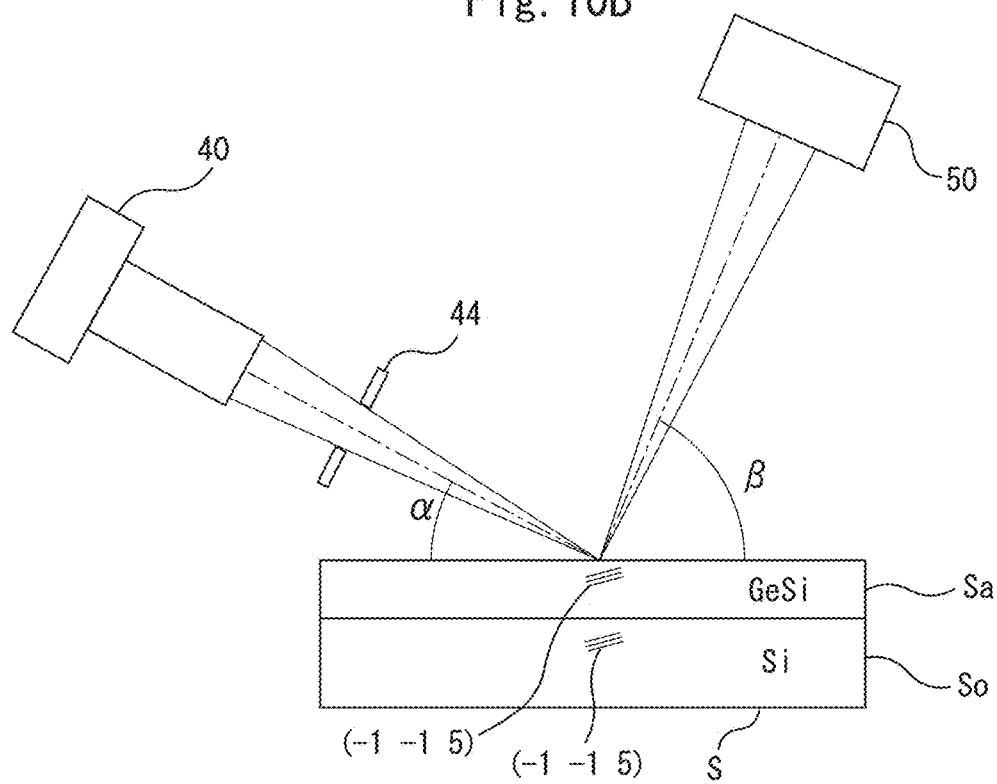

As shown in FIGS. 10A and 10B, the sample S is horizontally placed and fixed on the upper surface of the sample stage 10, X-rays are irradiated from the X-ray irradiation unit 40 to the surface of the sample S at a predetermined incident angle α, and diffracted X-rays emitted in a direction of an angle β from the surface of the sample S are detected by the X-ray detector 50. At this time, the incident angle α and the emission angle β to and from the surface of the sample S are set to angles at which X-rays are reflected so as to satisfy Bragg reflection on the asymmetric reflection crystal lattice planes (1 1 5) (−1 −1 5) in the Si substrate crystal So.

By setting the incident angle α and the emission angle β as described above, the peak intensities of diffracted X-rays reflected from the asymmetric reflection crystal lattice planes (1 1 5) (−1 −1 5) in the GeSi thin film Sa are detected at positions shifted by only angles Δβ from an angle β at which the peak intensity of the Si substrate crystal So is detected. The X-ray detector 50 uses a one-dimensional or two-dimensional X-ray detector having a detectable region in which the X-ray detector is capable of collectively detecting the diffracted X-rays reflected from the asymmetric reflection crystal lattice planes (1 1 5) (−1 −1 5) in the Si substrate crystal So and the diffracted X-rays reflected from the asymmetric reflection crystal lattice planes (1 1 5) (−1 −1 5) in the GeSi thin film Sa.

According to the one-dimensional X-ray detector or the two-dimensional X-ray detector, plural peak intensities of diffracted X-rays reflected from the sample can be detected while being fixed. Furthermore, according to the one-dimensional X-ray detector or the two-dimensional X-ray detector, it is also possible to measure diffracted X-rays reflected from the sample by using the scanning method based on the TDI mode.

Since the X-ray irradiation unit 40 can irradiate the surface of the sample S with monochromatic X-rays which are focused on a minute area with high resolution, the rocking curve measuring method can be implemented by collectively it sample S with a bundle of X-rays in the focusing angle range. Therefore, it is unnecessary to scan the X-ray incident angle θs, and for each of the asymmetric reflection crystal lattice planes (1 1 5) (−1 −1 5), a rocking curve targeting each of the asymmetric reflection crystal lattice planes (1 1 5) (−1 −1 5) can be obtained by only one-time X-ray irradiation.

Figure 11:
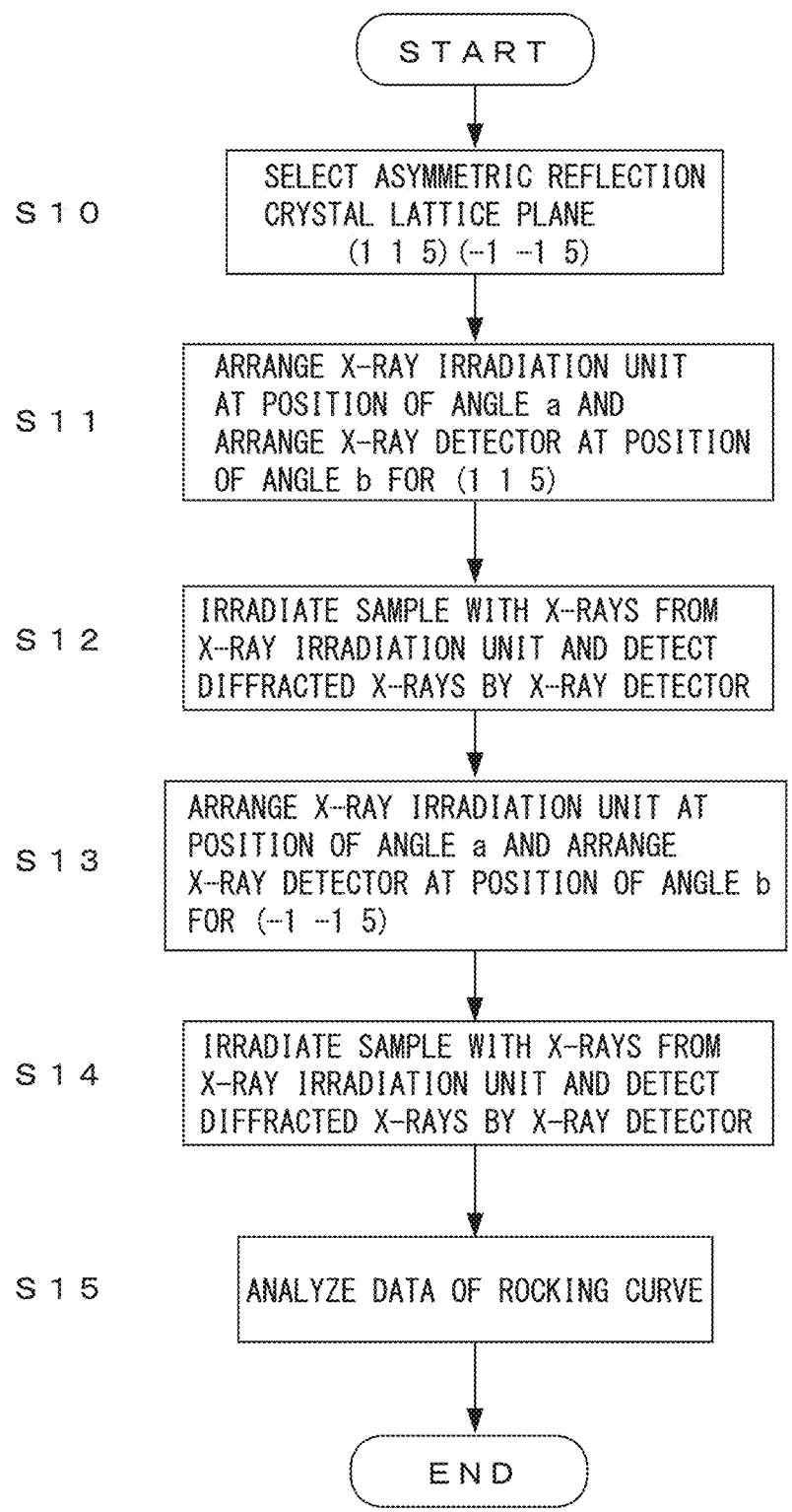
FIG. 11 is a flowchart showing a procedure of executing the rocking curve measuring method by the rocking curve measuring means.

FIG. 11 is a flowchart showing the procedure of executing the rocking curve measuring method by the rocking curve measuring means.

The central processing unit 100 selects two asymmetric reflection crystal lattice planes for a sample S placed on the sample stage 10 (step S10), and executes the rocking curve measuring method for each of the asymmetric reflection crystal lattice planes according to the procedure shown in FIG. 11.

A specific executing procedure will be described below on the assumption that crystal lattice planes of (1 1 5) (−1 −1 5) are selected.

First, for the targeted one asymmetric reflection crystal lattice plane (1 1 5), the X-ray irradiation unit 40 and the X-ray detector 50 are arranged at the positions of angles α and β with respect to the surface of the sample S which are determined on the basis of the Bragg angle of the Si substrate crystal So (step S11).

The surface of the sample S is irradiated with X-rays from the X-ray irradiation unit 40 for a certain time, and the reflection angle and the intensity of diffracted X-rays reflected from the sample S are detected by the X-ray detector 50 (step S12). Here, the diffracted X-rays reflected from the sample S contain diffracted X-rays reflected from the crystal lattice plane (1 1 5) of the Si substrate crystal So and diffracted X-rays reflected from the crystal lattice plane (1 1 5) of the GeSi thin film Se.

Next, for the other targeted asymmetric reflection crystal lattice plane (−1 −1 5), the X-ray irradiation unit 40 and the X-ray detector 50 are arranged at the positions of angles α and β with respect to the surface of the sample S which are determined on the basis of the Bragg angle of the Si substrate crystal So (step S13).

The surface of the sample S is irradiated with X-rays from the X-ray irradiation unit 40 for a certain time, and the reflection angle and the intensity of diffracted X-rays reflected from the sample S are detected by the X-ray detector 50 (step S14). Here, the diffracted X-rays reflected from the sample S contain diffracted X-rays reflected from the crystal lattice plane (−1 −5) of the Si substrate crystal So and diffracted X-rays reflected from the crystal lattice plane (−1 −1 5) of the GeSi thin film Sa.

Figure 12:
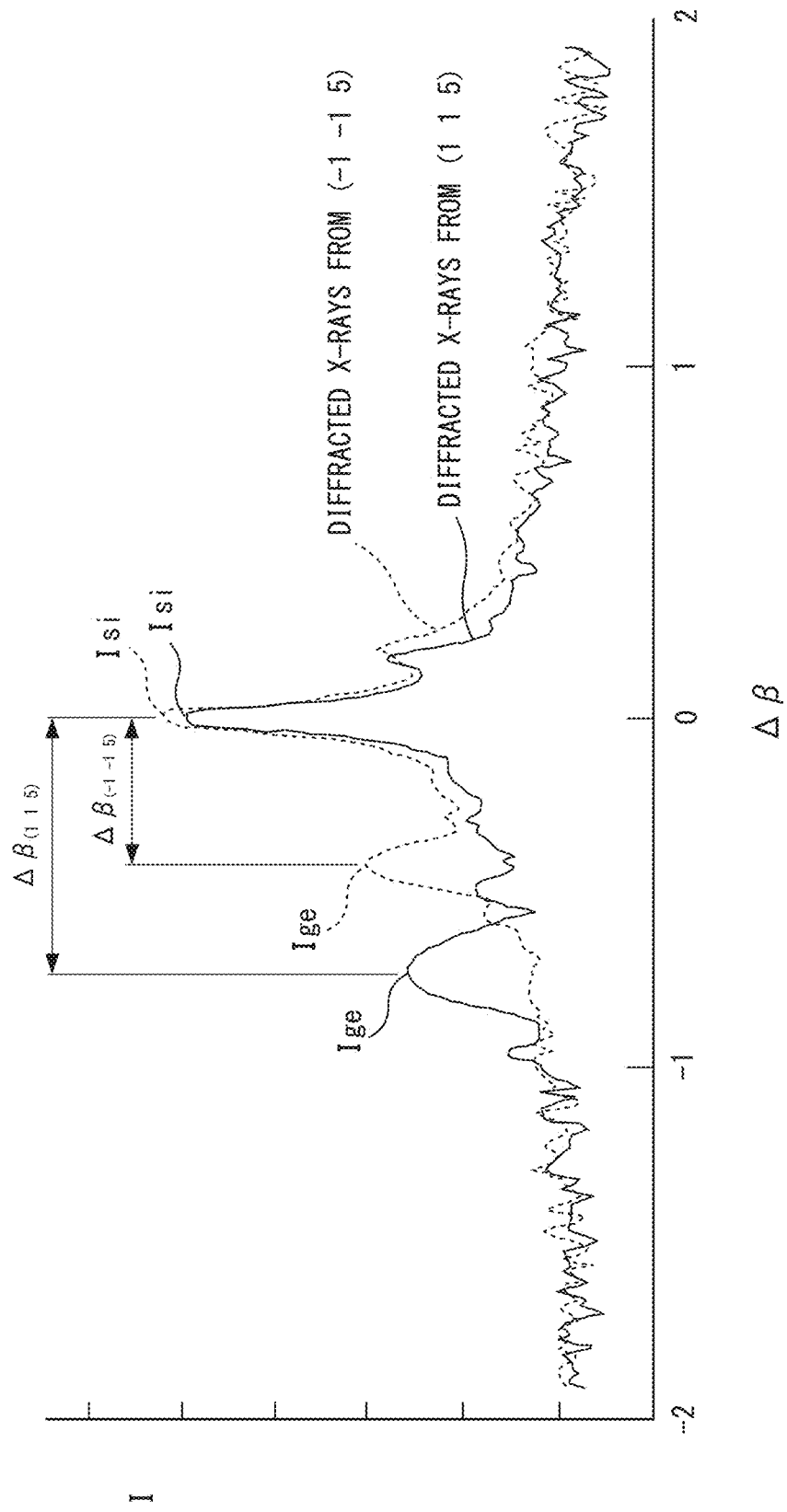
FIG. 12 is a diagram showing rocking curves of diffracted X-rays detected by an X-ray detector.

FIG. 12 is a diagram showing rocking curves of diffracted X-rays detected by the X-ray detector.

The rocking curve shown in FIG. 12 is obtained by displaying detection data of the diffracted X-rays by the X-ray detector 50 while setting the intensity of the diffracted X-rays on the ordinate axis and setting the reflection angle of the diffracted X-rays on the abscissa axis. With respect to the reflection angle (abscissa axis) of the diffracted X-rays, an angle at which a peak intensity Isi of the diffracted X-rays reflected from each of the crystal lattice planes (1 1 5) (−1 −1 5) of the Si substrate crystal So appears is set to an origin 0. Since the Si substrate crystal So has no strain, the respective peak intensities Isi of the diffracted X-rays reflected from the crystal lattice planes (1 1 5) (−1 −1 5) appear at the same angular position.

The central processing unit 100 analyzes data obtained by the rocking curve measuring method to calculate the lattice constants (a, c) of the GeSi thin film Sa, and further calculates a strain amount, an internal stress, etc. of the GeSi thin film Sa from the calculated lattice constants (a, c) as required (step S15).

That is, when observing the diffracted X-rays reflected from the crystal lattice plane (1 1 5), it is apparent that a peak intensity Ige of the diffracted X-rays reflected from the GeSi thin film Sa appears at an angle which is shifted from the peak intensity Isi of the diffracted X-rays reflected from the Si substrate crystal So by only $\Delta\beta_{(1\ 1\ 5)}$.

Likewise, when observing the diffracted X-rays reflected from the crystal lattice plane (−1 −1 5), it is apparent that a peak intensity Ige of the diffracted X-rays reflected from the GeSi thin film Sa appears at an angle which is shifted from the peak intensity Isi of the diffracted X-rays reflected from the Si substrate crystal So by only $\Delta\beta_{(-1\ -1\ 5)}$.

Occurrence of a shift angle between $\Delta\beta_{(1\ 1\ 5)}$ and $\Delta\beta_{(-1\ -1\ 5)}$ indicates that distortion occurs in the GeSi thin film Sa.

The in-plane lattice constant a of the GeSi thin film Sa and the lattice constant c in the normal direction can be calculated from the differential angles Δβ(1 1 5) and Δβ (−1 −1 5) at which the peak intensities Ige of the diffracted X-rays reflected from the GeSi thin films Sa appear.

[Analysis of Data Obtained by Rocking Curve Measuring Method]

Figure 13:
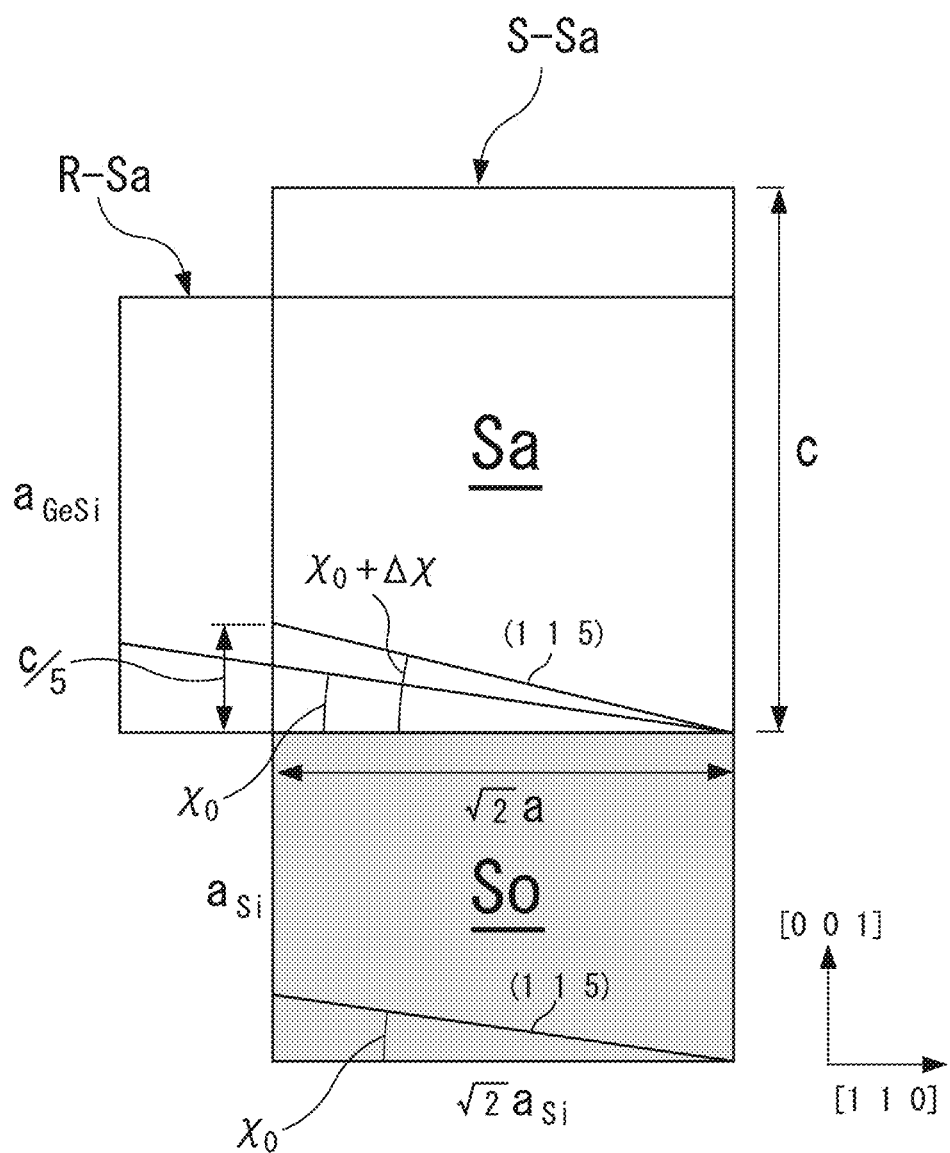
FIG. 13 is a diagram schematically showing a state of a crystal lattice when a GeSi thin film crystal is epitaxially grown on a surface of a Si substrate crystal.

Originally, Si and GeSi belong to the same cubic system, and thus each of the crystal lattice planes (1 1 5) and (−1 −1 5) should Be parallel between Si and GeSi. However, as shown in FIG. 13, when the GeSi thin film Sa changes from a state (R-Sa) where the crystal lattice in the in-plane direction of the GeSi thin film Sa is not restrained by the Si substrate crystal So to a state (S-Sa) where the crystal lattice is restrained and thus contracted by the Si substrate crystal So, this makes the crystal lattice to extend in the normal direction, and a deviation angle Δχ occurs in the crystal lattice planes (1 1 5) or (−1 −1 5) of both the GeSi thin film Sa and the Si substrate crystal So.

Also, when the difference in Bragg angle between Si and GeSi which is caused by the difference in interplanar spacing between Si and GeSi is represented by $\Delta\theta$, the angle difference $\Delta\beta$ between the diffraction peak from the Si substrate crystal So obtained by the rocking curve measuring method and the diffraction peak from the GeSi thin film Sa has the relationship of the following formulae (1) and (2). Here, $\Delta\beta_{(1\ 1\ 5)}$ represents the angle difference $\Delta\beta$ between the diffraction peak from the crystal lattice plane (1 1 5) of the Si substrate crystal So and the diffraction peak from the crystal lattice plane (1 1 5) of the GeSi thin film Sa. Furthermore, $\Delta\beta_{(-1\ -1\ 5)}$ represents the angle difference $\Delta\beta$ between the diffraction peak from the crystal lattice plane (−1 −1 5) of the Si substrate crystal So and the diffraction peak from the crystal lattice plane (−1 −1 5) of the GeSi thin Sa.

$$\Delta\beta_{(1\ 1\ 5)} = \Delta\theta - \Delta\chi \quad (1)$$

$$\Delta\beta_{(-1\ -1\ 5)} = \Delta\theta + \Delta\chi \quad (2)$$

The following formulae (3) and (4) can be obtained from the aforementioned formulae (1) and (2).

$$\Delta\theta = (\Delta\beta_{(1\ 1\ 5)} + \Delta\beta_{(-1\ -1\ 5)})/2 \quad (3)$$

$$\Delta\chi = -(\Delta\beta_{(1\ 1\ 5)} - \Delta\beta_{(-1\ -1\ 5)})/2 \quad (4)$$

In addition, the following formula (5) can be derived from the Bragg's law. Note that d represents the interplanar spacing for the crystal lattice plane (1 1 5) of the GeSi thin film Sa, $\lambda$ represents the wavelength of incident X-rays, and $\theta$ represents the Bragg angle at which the diffraction peak from the Si substrate crystal So appears.

$$2\ d \times \sin(\theta + \Delta\theta) = \lambda \quad (5)$$

Here, since $\theta$ and $\lambda$ are known values, d can be obtained by substituting the formula (3) into $\Delta\theta$ of the aforementioned formula (5).

Also, there is a relationship of the following formula (6) between the in-plane lattice constant a and the lattice constant c in the normal direction of GeSi and the interplanar spacing d.

$$1/d = \sqrt{\{(1/a)^2 + (1/a)^2 + (5/c)^2\}} \quad (6)$$

In the above formula (6), unknowns are the lattice constants a and c.

On the other hand, a formula representing the inclination of the lattice plane is provided by the following formulae (7) and (8). Here, $\chi_0$ represents the inclination angle of the crystal lattice plane (1 1 5) in a state where there is no strain in the GeSi thin film Sa, and it is equal to the inclination angle of the crystal lattice plane (1 1 5) of the Si substrate crystal So.

$$\cos\chi_0 = (0\ 0\ 1)(1\ 1\ 5)/|(0\ 0\ 1)||(1\ 1\ 5)| \quad (7)$$
$$= 5/3\sqrt{(3)}$$

$$\tan(\chi_0 + \Delta\chi) = (c/5)/\sqrt{(2a)} \quad (8)$$

By substituting $\chi_0$ obtained from the formula (7) and $\Delta\chi$ obtained from the formula (4) into the aforementioned formula (8), unknowns are two values of the lattice constants a and c.

Accordingly, by solving the simultaneous equations of the above formulae (6) and (8), it is possible to calculate the in-plane lattice constant a of GeSi and the lattice constant c in the normal direction of GeSi.

A calculation formula for obtaining the lattice constant of the GeSi thin film Sa from the aforementioned $\Delta\beta_{(1\ 1\ 5)}$ and $\Delta\beta_{(-1\ -1\ 5)}$ obtained by the rocking curve measuring method has been already known, and for example, it is also disclosed in Non-Patent Documents 2 and 3.

Furthermore, when the lattice constants a and c of the GeSi thin film Sa are known, the strain amount and the magnitude of the internal stress of the GeSi thin film Sa can be further calculated from a tensor formula of stress by using the lattice constants a and c and a known elastic constant. It is possible to further calculate the concentration of Ge (germanium) in the GeSi thin film Sa, the composition of the GeSi thin film Sa, the lattice constants under a state where the stress of the GeSi thin film Sa is released, and the like.

The X-ray inspection device according to the present embodiment has a function of storing, into the storage unit 110, the measurement data obtained by the rocking curve measuring method and the analyzed data of the lattice constants a, c, etc. calculated by the central processing unit 100, displays these data on the display unit 202, and transmits these data from the communication unit 203 via a network to a server or a host computer according to setting performed via the operating unit 201 shown in FIG. 7 by an operator.

[Rocking Curve Measuring Method Targeting One Crystal Lattice Plane of Symmetric Reflection]

As shown in FIG. 13, in order to determine whether the GeSi thin film Sa is under the state (S-Sa) where the crystal lattice in the in-plane direction of the GeSi thin film Sa is restrained and contracted by the Si substrate crystal So or under the state (R-Sa) where the crystal lattice in the in-plane direction of the GeSi thin film Sa is not restrained by the Si substrate crystal So and thus is released, it is necessary to analyze the lattice constant a in the plane of GeSi and the lattice constant c in the normal direction of GeSi while the lattice constants a and c are set as unknowns. Therefore, in the rocking curve measuring means described above, a measurement is performed while two equivalent asymmetric reflection crystal lattice planes are targeted.

On the other hand, when the thickness of the GeSi thin film Sa is thin and it is apparent that the GeSi thin film Sa is under the state (S-Sa) where the crystal lattice in the in-plane direction thereof is restrained and thus contracted by the Si substrate crystal So, the in-plane lattice constant a of GeSi is equal to the in-plane lattice constant of the Si substrate crystal So, and thus it is not necessary to calculate the in-plane lattice constant a of GeSi. That is, only the lattice constant c in the normal direction of GeSi is an unknown.

In such a case, as described above, it is unnecessary to execute the rocking curve measuring method targeting two equivalent asymmetric reflection crystal lattice planes, and the lattice constant c in the normal direction of GeSi can be calculated by executing the rocking curve measuring method targeting only one crystal lattice plane of symmetrical reflection.

[Application of Rocking Curve Measuring Method]

In the rocking curve measuring means described above, the rocking curve measuring method is carried out while the X-ray irradiation unit 40 and the X-ray detector 50 are fixed. However, as shown in FIGS. 14A to 14C, the present embodiment may be configured so that the rocking curve measuring method may be executed while the X-ray irradiation unit 40 is oscillated within a virtual vertical plane which is orthogonal to the surface of the sample S and contains the optical axis.

Figure 14A:
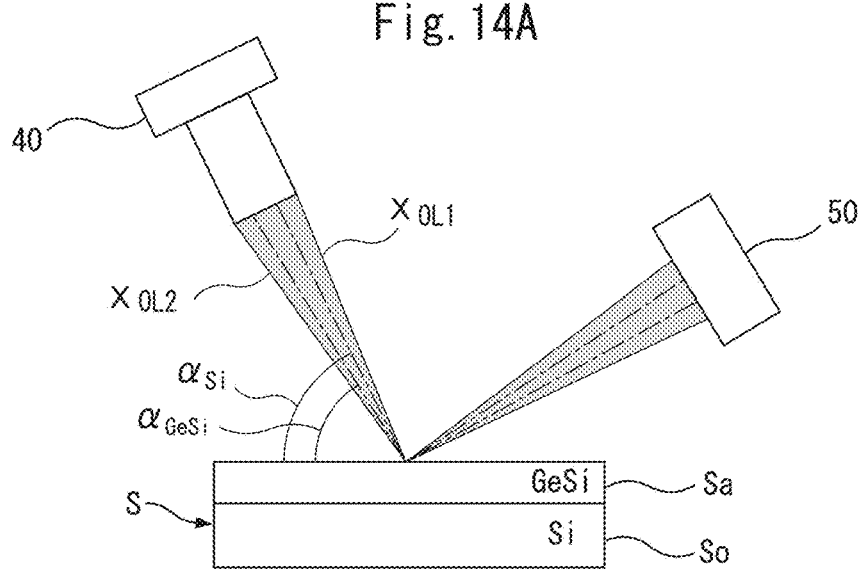
FIGS. 14A, 14B, and 14C are schematic diagrams showing a configuration for performing the rocking curve measuring method by oscillating the X-ray irradiation unit.
Figure 14B:
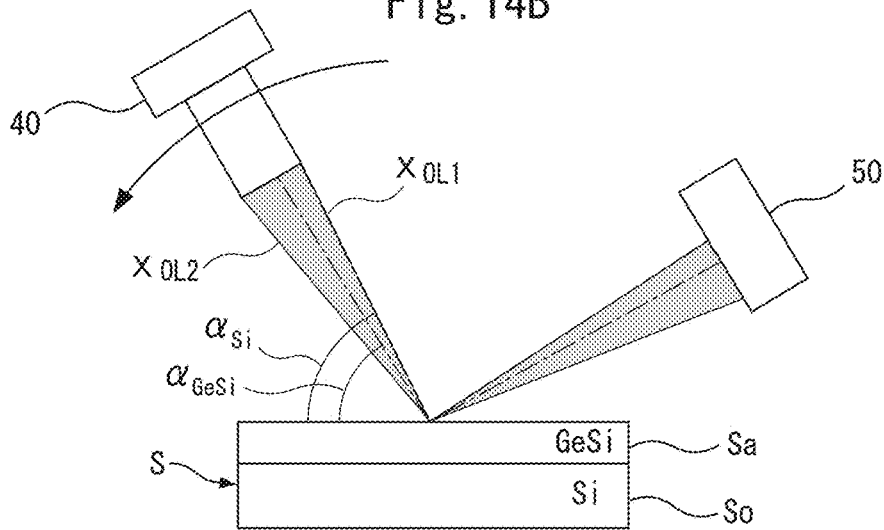
Figure 14C:
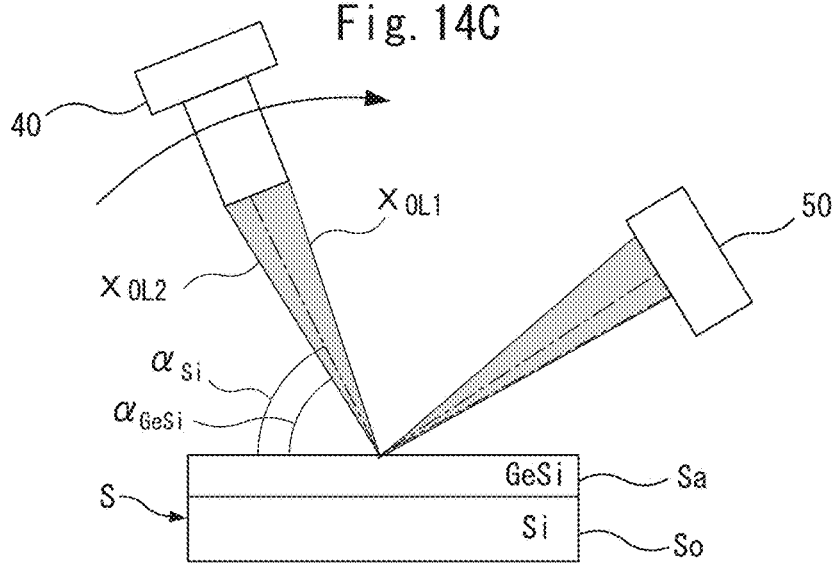

In this case, it is preferable that as shown in FIGS. 14A to 14C, the oscillation range of the X-ray irradiation unit 40 ranges from an oscillation angle at which one outer edge $X_{OL1}$ on a high angle side of focusing X-rays is substantially coincident with a Bragg angle $α_{Si}$ satisfying a diffraction condition of the Si substrate crystal So on the high angle side (FIG. 14B) to an oscillation angle at which the other outer edge $X_{OL2}$ on a low angle side of the focusing X-rays is substantially coincident with a Bragg angle $α_{GeSi}$ satisfying a diffraction condition of the GeSi thin film Sa on the low angle side (FIG. 14C).

By oscillating the X-ray irradiation unit 40, the X-ray intensity distribution with respect to the incident angle can be equalized, and a highly accurate rocking curve measuring method can be realized.

Furthermore, the present embodiment may be configured so that the X-ray irradiation unit 40 and the X-ray detector 50 are scanned interlockingly with each other.

Figure 15A:
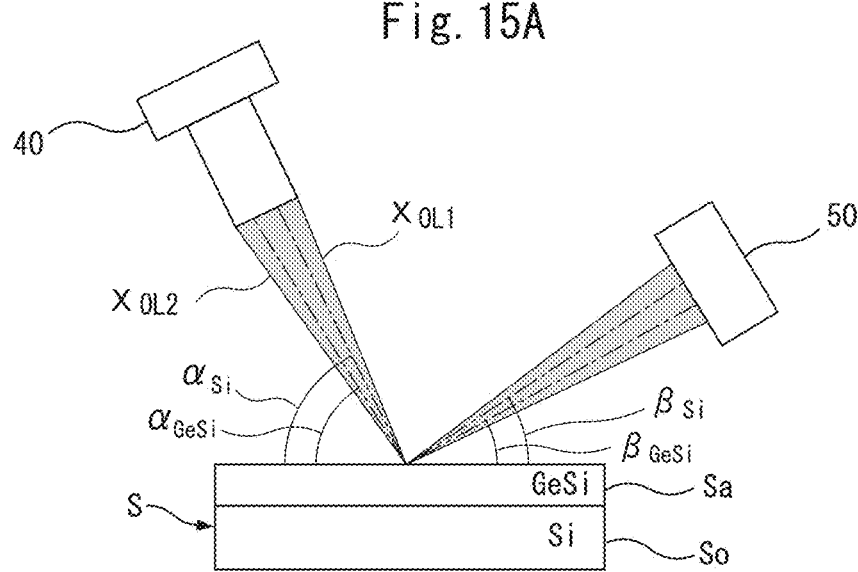
FIGS. 15A, 15B, and 15C are schematic diagrams showing a configuration for performing the rocking curve measuring method by scanning each of the X-ray irradiation unit and the X-ray detector.
Figure 15B:
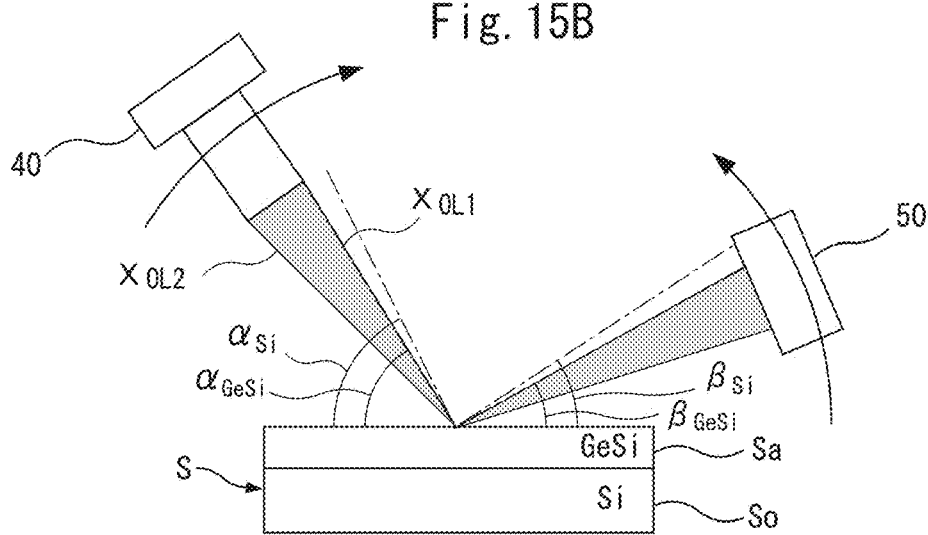
Figure 15C:
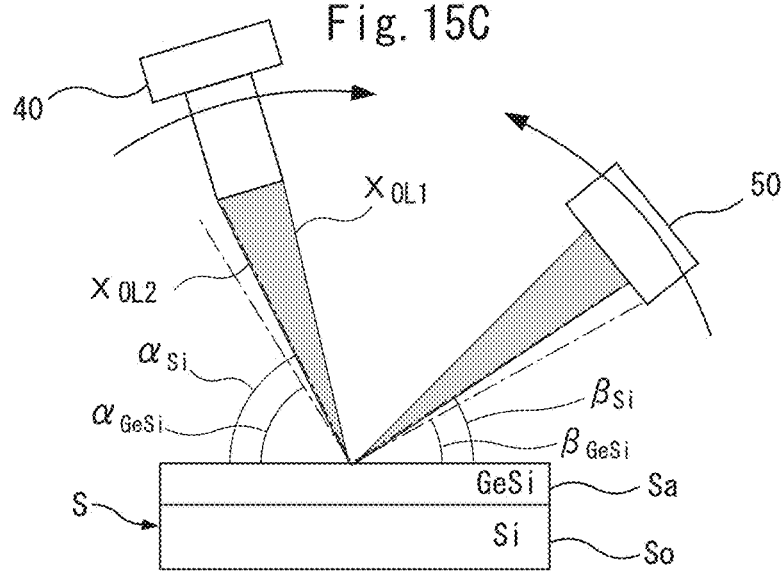

In this case, the X-ray detector 50 measures diffracted X-rays reflected from a sample by using the scanning method based on the TDI mode. By adopting the scanning method based on the TDI mode, it is possible to execute a highly accurate rocking curve measuring method over a wide angular range as shown in FIGS. 15A to 15C. For example, the scanning can be performed in a broad range from an angle at which one outer edge $X_{OL1}$ on a high angle side of focusing X-rays substantially coincides with a Bragg angle $α_{GeSi}$ satisfying a diffraction condition of the GeSi thin film Sa on a lower angle side (FIG. 15B) to an angle at which the other outer edge $X_{OL2}$ on a low angle side of the focusing X-rays substantially coincides with a Bragg angle $α_{Si}$ satisfying a diffraction condition of the Si substrate crystal So on a low angle side (FIG. 15C).

By scanning the X-ray irradiation unit 40 and the X-ray detector 50 in such a large angular range as described above, it is possible to equalize the intensity of X-rays to be irradiated to the sample S and realize the highly accurate rocking curve measuring method even when the intensity distribution of the focusing X-rays emitted from the X-ray irradiation unit 40 with respect to the incident angle is large, or even when the peak angle of the diffracted X-rays from the substrate crystal is apart from the peak angle of the diffracted X-rays from the thin film crystal.

FIG. 16 shows a scanning method of the X-ray detector based on the TDI mode.

In the TDI mode, as shown in FIG. 16, plural X-ray detectors a1, a2, a3, and a4 arranged side by side are scanned in a parallel direction (Q direction in FIG. 16), and detection data are read from each of the X-ray detectors a1, a2, a3, and a4 at timings t1, t2, t3, and t4 at which each X-ray detector moves. Then, the respective detection data of the X-ray detectors a1, a2, a3, and 4 are summed up for each of scan angles $2θ_1$, $2θ_2$, $2θ_3$, and $2θ_4$ to obtain the X-ray intensity at each of the scan angles $2θ_1$, $2θ_2$, $2θ_3$, and $2θ_4$.

In general, the measurement based on the TDI mode has an advantage that a large detection intensity can be obtained at each scanning angle as well as speed-up of the measurement.

[Reciprocal Space Map Measurement]

Next, a reciprocal space map measurement using the X-ray inspection device having the aforementioned configuration will be described in detail.

The reciprocal space map measurement is a method of measuring the intensity distribution in a reciprocal lattice space of diffracted X-rays reflected from an asymmetric reflection crystal lattice plane in a crystal sample. By this reciprocal space map measurement, for example, the lattice constant of a thin film crystal epitaxially grown on a substrate crystal can be obtained.

The X-ray inspection device according to the present embodiment is incorporated with means for implementing the reciprocal space map measurement. Like the rocking curve measuring means described above, this reciprocal space map measuring means is stored as software in the storage unit 110 of FIG. 7, and executed by the central processing unit (CPU) 100.

For example, when the reciprocal space map measurement is performed by using, as the sample S, a semiconductor wafer in which a GeSi thin film Sa is epitaxially grown on the surface of a Si substrate crystal So, asymmetric reflection crystal lattice planes in the Si substrate crystal So and the GeSi thin film Sa are targeted and irradiated with monochromatic collimated X-rays, and the intensities and reflection angles of diffracted X-rays reflected from the crystal lattice planes are detected by the X-ray detector. The irradiation of X-rays and the detection of the diffracted X-rays as described above are performed every minute angle while the incident angle α of the X-rays and the detection angle β of the diffracted X-rays with respect to the surface of the sample S satisfy the Bragg condition on the target crystal lattice planes.

Figure 17:
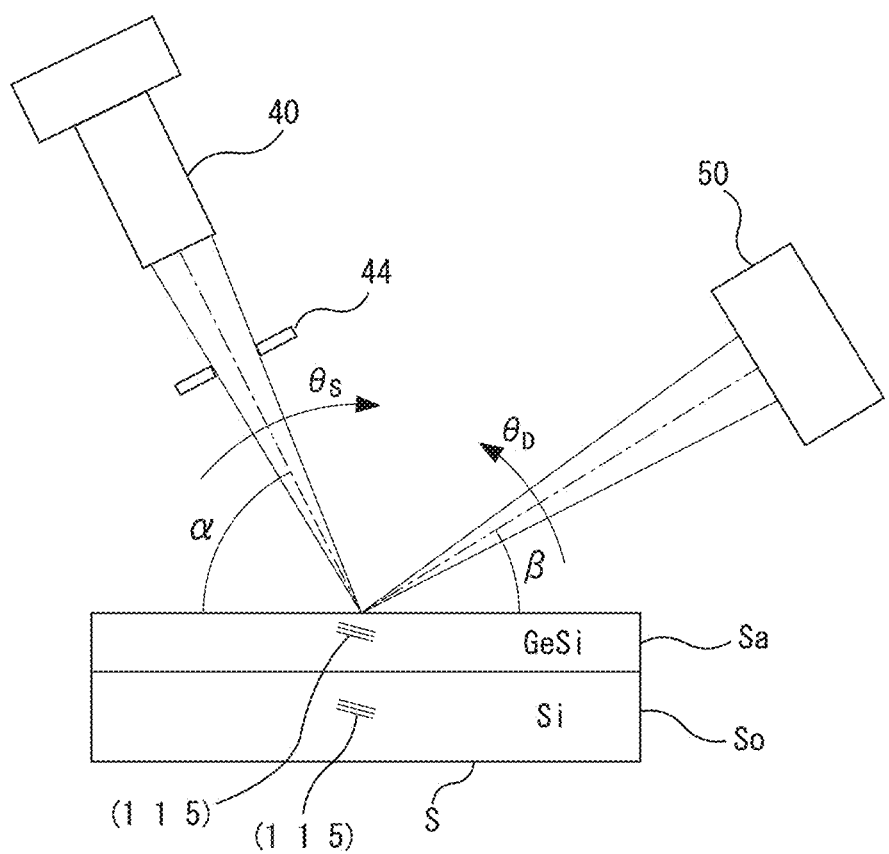
FIG. 17 is a schematic diagram showing an outline of a reciprocal space map measuring method by reciprocal space map measuring means incorporated in the X-ray inspection device according to the embodiment of the present invention.

Specifically, as shown in FIG. 17, the X-ray detector 50 is moved in the angle direction of $θ_D$ while the X-ray irradiation unit 40 is also moved in the angle direction of $θ_s$, and the diffracted X-rays reflected from the target crystal lattice plane are detected for each minute angle.

The X-rays are greatly narrowed by the focusing slit 44, whereby the X-ray irradiation unit 40 can produce monochromatic collimated X-rays. For example, X-rays are narrowed so that the cross-sectional area of the X-rays is contracted to about 1/100, for example, whereby X-rays near to monochromatic collimated X-rays can be obtained.

It is preferable that the X-ray detector 50 uses a high-speed two-dimensional X-ray detector capable of observing a wide range of two-dimensional X-ray diffraction images. By using such a high-speed two-dimensional X-ray detector, the measurement time can be greatly shortened.

As described above, after the measurement is completed with respect to the incident angle α in the preset range and the reflection angle β of the diffracted X-rays, reciprocal space map is created from the obtained detection data of the diffracted X-rays.

Figure 18:
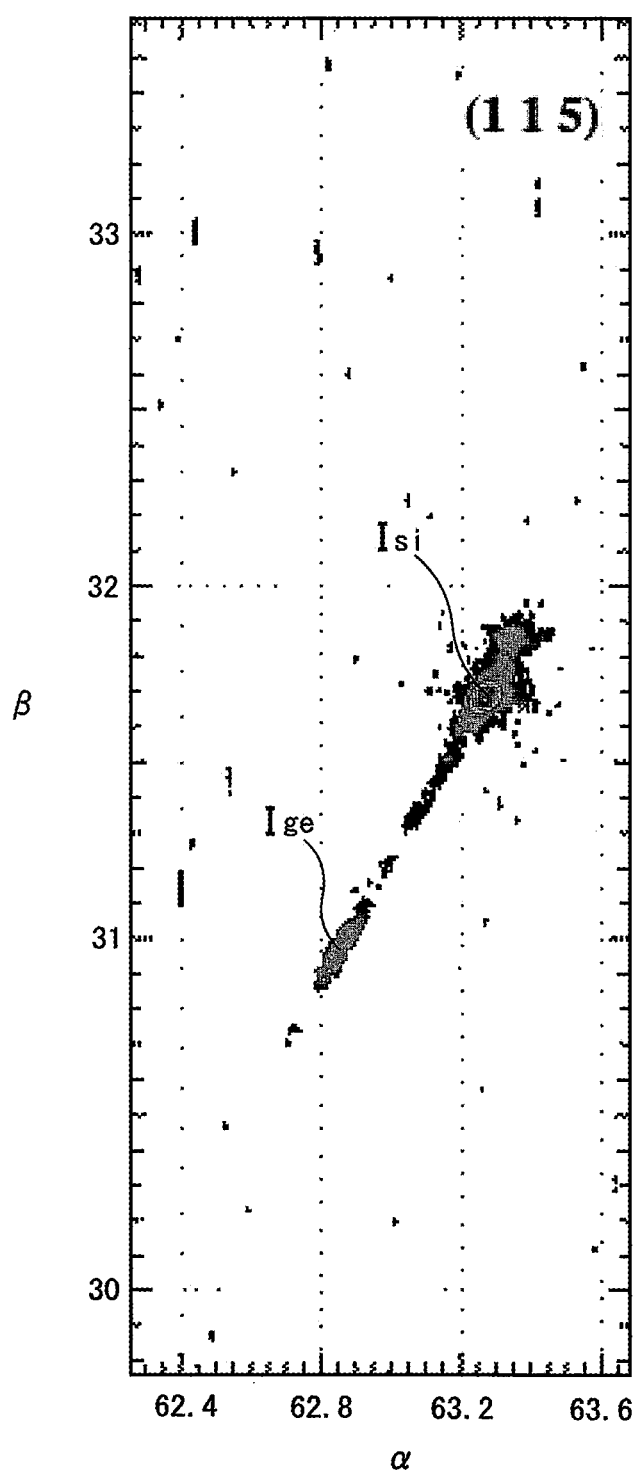
FIG. 18 is a diagram showing an example of a reciprocal space map.

FIG. 18 shows an example of the reciprocal space map. The reciprocal space map of FIG. 18 displays the intensity distribution in the reciprocal lattice space of the diffracted X-rays detected by the X-ray detector 50 while the abscissa axis is set to the incident angle α of the X-rays with respect to the target crystal lattice plane, and the ordinate axis is set to the reflection angle β of the diffracted X-rays from the target crystal lattice plane.

In FIG. 18, Isi represents the peak intensity position of the diffracted X-rays reflected from the crystal lattice plane of the Si substrate crystal So, and Ige represents the peak intensity position of the diffracted X-rays reflected from the crystal lattice plane of the GeSi thin film Sa.

Figure 19:
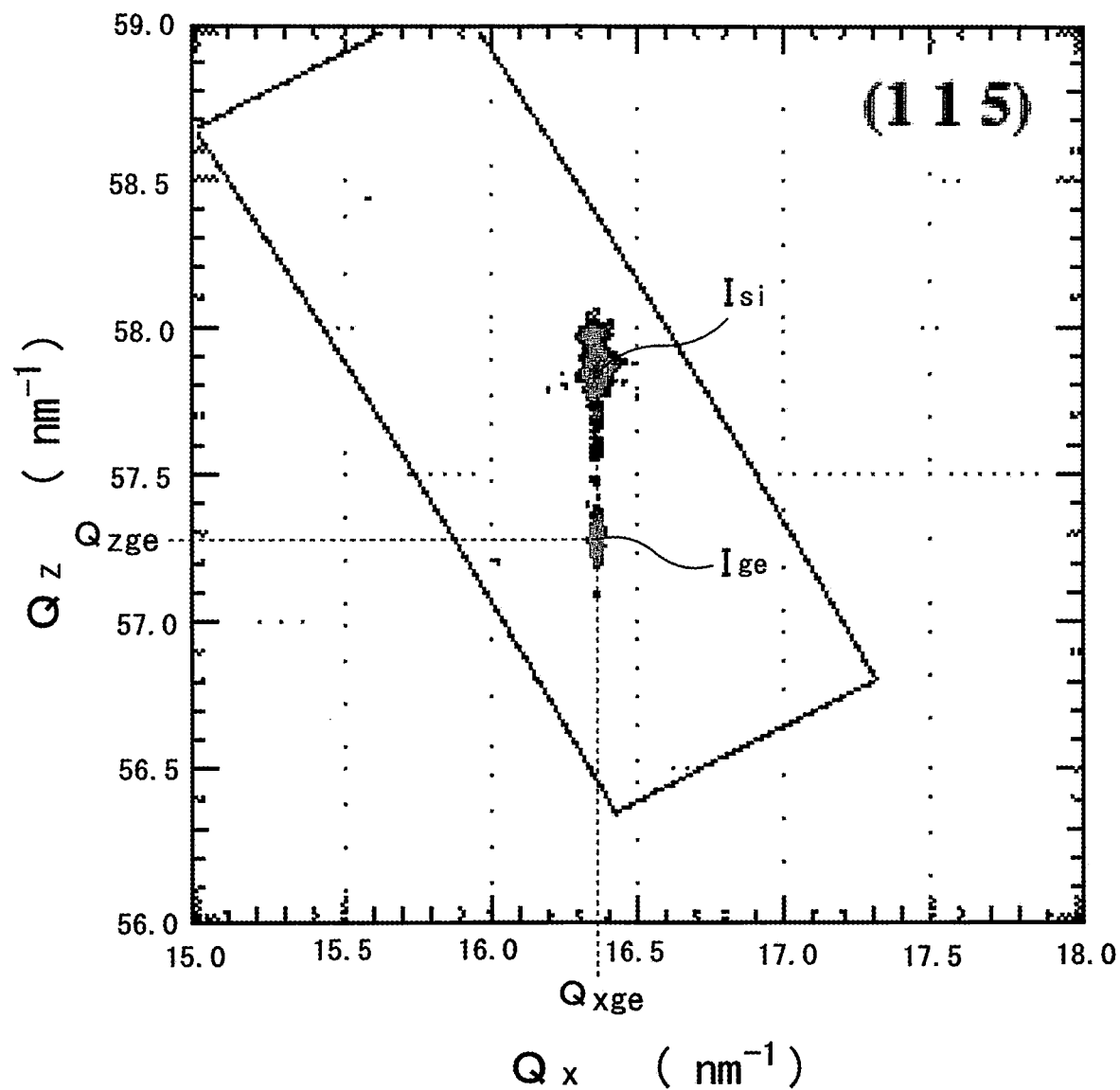
FIG. 19 is a diagram showing the reciprocal space map of FIG. 18 which is subjected to coordinate conversion.

FIG. 19 shows a coordinate conversion of the reciprocal space map of FIG. 18, and the position of the peak intensity Isi of the diffracted X-rays from the Si substrate crystal So, and the position of the peak intensity position Ige of the diffracted X-rays from the GeSi thin film Sa are arranged at the same angular position of the abscissa axis Qx.

The lattice constants (a, c) of the GeSi thin film Sa can be calculated from the angular positions Oxge, Qzge of the peak intensity Ige of the diffracted X-rays from the GeSi thin film Sa in FIG. 19. Furthermore, the strain amount, the internal stress, etc. of the GeSi thin film Sa can be obtained from the calculated lattice constants (a, c) as required.

Since a calculation formula for obtaining the lattice constants (a, c) of the GeSi thin film Sa from Qx, Qz has been already well known, and thus detailed description thereof will be omitted.

It is to be noted that the present invention is not limited to the aforementioned embodiment, and various modifications and applications can be made without departing from the subject matter of the present invention.

For example, the X-ray inspection device of the aforementioned embodiment aims at a semiconductor wafer flowing through a semiconductor manufacturing line as an inspection target. However, the present invention is not limited to this. For example, the present invention may be applied to an X-ray inspection in which a minute site of a semiconductor element is targeted as a site-under-measurement in a subsequent process of a semiconductor manufacturing line.

The invention claimed is:

1. An X-ray inspecting device comprising:
a sample stage on which an inspection target sample is placed;
image observing means for observing an image of the sample placed on the sample stage;
a positioning mechanism that is controlled based on an image observation result of the sample by the image observing means to move the sample stage in two orthogonal directions on a horizontal plane, a height direction, and an in-plane rotation direction;
a goniometer including first and second rotation members that rotate independently of each other along a virtual plane perpendicular to a surface of the sample around a rotational axis contained in the same plane as the surface of the sample placed on the sample stage;
an X-ray irradiation unit that is installed in the first rotation member and focuses and irradiates characteristic X-rays to an inspection position set in the same plane as the surface of the sample placed on the sample stage;
an X-ray detector installed in the second rotation member, wherein the X-ray irradiation unit includes an X-ray tube for generating X-rays, and an X-ray optical element for receiving X-rays irradiated from the X-ray tube, extracting only characteristic X-rays of a specific wavelength and focusing the extracted characteristic X-rays on the inspection position, and the X-ray optical element includes a first X-ray optical element for focusing the characteristic X-rays so that a height of the characteristic X-rays decreases within a virtual vertical plane orthogonal to the surface of the sample and containing an optical axis, and a second X-ray optical element for focusing the characteristic X-rays so that a width of the characteristic X-rays decreases within a virtual plane orthogonal to the virtual vertical plane and containing the optical axis, and wherein the first X-ray optical element is constituted by a crystal material having high crystallinity, and the second X-ray optical element comprises a multilayer mirror; and
rocking curve measuring means for executing a method for measuring rocking curve on a sample in which a thin film crystal is epitaxially grown on a substrate crystal, wherein the rocking curve measuring means has a function of executing the following operations (I) to (VI):
(I) selecting two equivalent asymmetrical reflection crystal lattice planes for the sample;
(II) arranging the X-ray irradiation unit and the X-ray detector at angular positions for the sample surface determined based on a Bragg angle of the substrate crystal in the sample for one of the selected crystal lattice planes;
(III) irradiating the sample surface with X-rays from the X-ray irradiation unit, and detecting a reflection angle and intensity of diffracted X-rays reflected from the sample by the X-ray detector;
(V) arranging the X-ray irradiation unit and the X-ray detector at angular positions for the sample surface determined based on a Bragg angle of the substrate crystal in the sample for the other selected crystal lattice plane;
(V) irradiating the sample surface with X-rays from the X-ray irradiation unit, and detecting a reflection angle and intensity of diffracted X-rays reflected from the sample by the X-ray detector; and
(VI) obtaining a rocking curve based on the reflection angle and intensity of the diffracted X-rays detected by the X-ray detector, and analyzing data on the rocking curve,
wherein the rocking curve measuring means further has a function of executing the following operations (VI-I) to (VI-IV) in the operation (VI):
(VI-I) determining an angular difference between a diffraction peak in the substrate crystal of the sample and diffraction peaks of two equivalent asymmetric reflections in the thin film crystal of the sample;
(VI-II) calculating a lattice constant of the thin film crystal of the sample from the angular difference of the diffraction peaks determined by the operation (VI-I);
(VI-III) calculating, from a known elastic constant of the thin film crystal of the sample and the calculated lattice constant, at least one of a strain of the thin film crystal, a lattice constant under a state where a stress of the thin film crystal is released, a composition of the thin film crystal and the stress of the thin film crystal; and
(VI-IV) outputting a calculation result obtained by the operation (VI-III).

2. The X-ray inspecting device according to claim 1, wherein the first X-ray optical element uses a crystal material and is configured to reflect X-rays by lattice planes having an inherent rocking curve width of 0.06° or less in the crystal material.

3. The X-ray inspecting device according to claim 1, wherein the X-ray irradiation unit includes a focusing angle control member for controlling a focusing angle of the characteristic X-rays in the virtual vertical plane orthogonal to the surface of the sample and containing the optical axis.

4. The X-ray inspecting device according to claim 3, wherein the focusing angle control member comprises a slit member having a slit for transmitting only a part having any width of the characteristic X-rays focused by the first X-ray optical element.

5. The X-ray inspecting device according to claim 4, wherein the X-ray irradiation unit is configured so that respective components of the X-ray tube, the X-ray optical element, and the slit member are incorporated in an unit main body that is rotatably installed in the first rotation member.

6. The X-ray inspecting device according to claim 1, wherein the X-ray detector comprises a one-dimensional X-ray detector or a two-dimensional X-ray detector.

7. A method for measuring rocking curve that uses the X-ray inspecting device according to claim 1 to perform a rocking curve measurement on a sample in which a thin film crystal is epitaxially grown on a substrate crystal and includes the following steps A to D:
- step A of selecting two equivalent asymmetric reflection crystal lattice planes for the sample;
- step B of arranging the X-ray irradiation unit and the X-ray detector at angular positions for the sample surface determined based on a Bragg angle of the substrate crystal in the sample for one of the selected crystal lattice planes;
- step C of irradiating the sample surface with X-rays from the X-ray irradiation unit, and detecting a reflection angle and intensity of diffracted X-rays reflected from the sample by the X-ray detector;
- step D of arranging the X-ray irradiation unit and the X-ray detector at angular positions for the sample surface determined based on a Bragg angle of the substrate crystal in the sample for the other selected crystal lattice plane;
- step E of irradiating the sample surface with X-rays from the X-ray irradiation unit, and detecting a reflection angle and intensity of diffracted X-rays reflected from the sample by the X-ray detector; and
- step F of obtaining a rocking curve based on the reflection angle and intensity of the diffracted X-rays detected by the X-ray detector, and analyzing data on the rocking curve,
wherein the step F further includes the following steps F-1 to F-4:
- step F-1 of determining an angular difference between a diffraction peak in the substrate crystal of the sample and diffraction peaks of two equivalent asymmetric reflections in the thin film crystal of the sample;
- step F-2 of calculating a lattice constant of the thin film crystal of the sample from the angular difference of the diffraction peaks determined by the operation of the step F-1;
- step F-3 of calculating, from a known elastic constant of the thin film crystal of the sample and the calculated lattice constant, at least one of a strain of the thin film crystal, a lattice constant under a state where a stress of the thin film crystal is released, a composition of the thin film crystal and the stress of the thin film crystal; and
- step F-4 of outputting a calculation result obtained in the step F-3.

8. The X-ray inspecting device according to claim 1, wherein the X-ray irradiation unit includes a focusing angle control member for controlling a focusing angle of the characteristic X-rays in a virtual vertical plane orthogonal to the surface of the sample and containing the optical axis, sets a focusing angle of X-rays to be irradiated on the sample surface from the X-ray irradiation unit to 2° or more by the focusing angle control member, and irradiates the sample surface with X-rays in an angle range of 2° or more, and wherein the X-ray detector comprises a one-dimensional X-ray detector or a two-dimensional X-ray detector, and diffracted X-rays reflected from the sample are made incident to the X-ray detector to detect a reflection angle and intensity of the diffracted X-rays.

9. The X-ray inspecting device according to claim 8, wherein the X-ray irradiation unit is configured to oscillate in a virtual vertical plane orthogonal to the surface of the sample and containing the optical axis to irradiate the sample surface with X-rays.

10. The X-ray inspecting device according to claim 8, wherein the X-ray detector and the X-ray irradiation unit are scanned interlockingly with each other within a virtual vertical plane orthogonal to the surface of the sample and containing the optical axis to measure diffracted X-rays reflected from the sample by a scanning method based on a TDI Mode.

* * * * *

UNITED STATES PATENT AND TRADEMARK OFFICE
CERTIFICATE OF CORRECTION

PATENT NO. : 10,876,978 B2  
APPLICATION NO. : 16/205801  
DATED : December 29, 2020  
INVENTOR(S) : Kiyoshi Ogata et al.

Page 1 of 1

It is certified that error appears in the above-identified patent and that said Letters Patent is hereby corrected as shown below:

In the Claims

Change Column 22, Line 15 Claim 1:  
(V) arranging the X-ray irradiation unit and the X-ray To be:  
(IV) arranging the X-ray irradiation unit and the X-ray Signed and Sealed this  
Ninth Day of March, 2021

Drew Hirshfeld  
*Performing the Functions and Duties of the*  
*Under Secretary of Commerce for Intellectual Property and*  
*Director of the United States Patent and Trademark Office*